(12) United States Patent
Near et al.

(10) Patent No.: US 11,676,639 B2
(45) Date of Patent: Jun. 13, 2023

(54) INTELLIGENT SPORTS VIDEO AND DATA GENERATION FROM AI RECOGNITION EVENTS

(71) Applicant: Helios Sports, Inc., Portsmouth, NH (US)

(72) Inventors: William G. Near, Portsmouth, NH (US); Jason W. Evans, Somerville, MA (US)

(*) Notice: Subject to any disclaimer, the term of this patent is extended or adjusted under 35 U.S.C. 154(b) by 0 days.

(21) Appl. No.: 17/332,720

(22) Filed: May 27, 2021

(65) Prior Publication Data

US 2021/0375325 A1 Dec. 2, 2021

Related U.S. Application Data

(60) Provisional application No. 63/030,688, filed on May 27, 2020.

(51) Int. Cl.
| | | |
|---|---|---|
| *G11B 27/11* | (2006.01) | |
| *G11B 27/031* | (2006.01) | |
| *G11B 27/34* | (2006.01) | |
| *G06V 20/40* | (2022.01) | |

(52) U.S. Cl.
CPC ............ *G11B 27/11* (2013.01); *G06V 20/42* (2022.01); *G11B 27/031* (2013.01); *G11B 27/34* (2013.01)

(58) Field of Classification Search
CPC ....... G11B 27/11; G11B 27/031; G11B 27/34; G06V 20/42

USPC .......................................................... 386/241
See application file for complete search history.

(56) References Cited

U.S. PATENT DOCUMENTS

| | | | | |
|---|---|---|---|---|
| 2010/0182436 A1* | 7/2010 | Boman | ............... | A63K 1/00 342/450 |
| 2015/0106025 A1* | 4/2015 | Keller | ............... | A63B 71/06 702/19 |
| 2015/0127284 A1* | 5/2015 | Seshan | ............... | G01D 21/00 702/89 |
| 2016/0049173 A1* | 2/2016 | Anderson | ............. | G11B 27/10 386/241 |
| 2017/0118539 A1* | 4/2017 | Lokshin | ............... | G11B 27/28 |
| 2017/0161382 A1* | 6/2017 | Ouimet | ................ | G06F 16/434 |
| 2019/0205651 A1* | 7/2019 | Chang | ............... | H04N 21/4345 |
| 2019/0388728 A1* | 12/2019 | Wang | ............... | G06K 9/0051 |

OTHER PUBLICATIONS

17332720_2022-09-08_CN_110800273_A_M (Year: 2020).*

* cited by examiner

*Primary Examiner* — Loi H Tran
(74) *Attorney, Agent, or Firm* — Ascentage Law, PLLC; Travis L. Johnson

(57) ABSTRACT

An intelligent sports video and data generating system using AI detection engines in Sports Detection Devices, broadcasting commands that incorporate global time stamp information to a plurality of the Sports Detection Devices, such that the recorded sports action data can be time-aligned with video data, wherein an automatically spliced together video or data set can be generated based on the parameters of an input query.

18 Claims, 24 Drawing Sheets

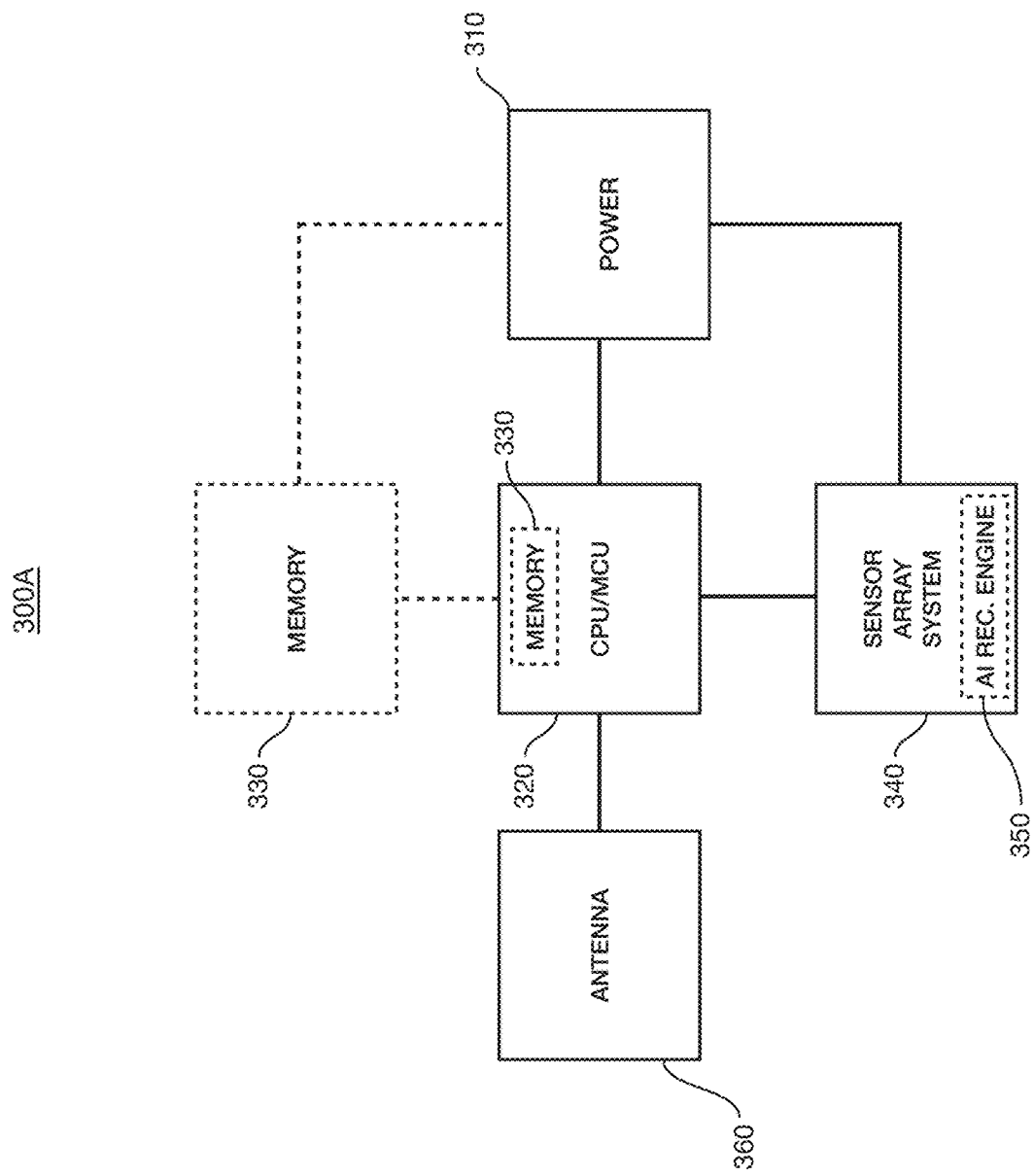

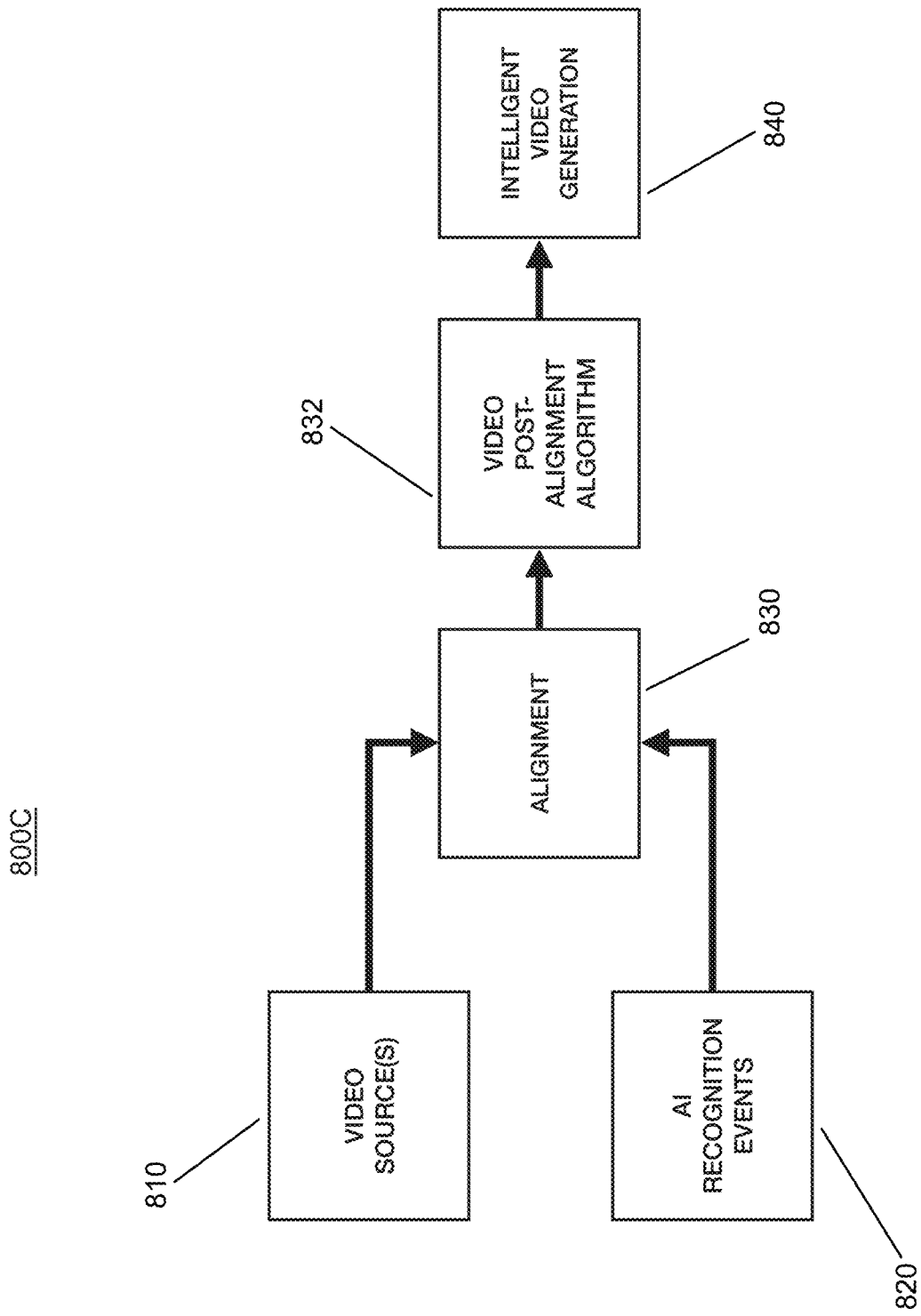

| START COMMAND CODE | SPORTS SESSION ID | TIME OFFSET | TEAM ID |

FIG. 10A

| UPDATE COMMAND CODE | SPORTS SESSION ID | TIME OFFSET | TEAM ID |

FIG. 10B

| STOP COMMAND CODE | SPORTS SESSION ID | TIME OFFSET | TEAM ID |

FIG. 10C

| ANNOTATE COMMAND CODE | SPORTS SESSION ID | TIME OFFSET | TEAM ID |

FIG. 10D

| TIME TRIAL COMMAND CODE | SPORTS SESSION ID | TIME OFFSET | TEAM ID |

FIG. 10E

INTELLIGENT SPORTS VIDEO AND DATA GENERATION FROM AI RECOGNITION EVENTS

CROSS-REFERENCE TO RELATED APPLICATIONS

This application claims the benefit of U.S. Provisional Patent Application No. 63/030,688 filed on May 27, 2020; which is herein incorporated by reference in entirety.

FIELD OF THE INVENTION

The present invention relates generally to aspects of detecting sports actions using a Sports Detection Device having embedded therein an artificial intelligence sports recognition engine and methods to align captured video data with detected sports actions or alternatively align and compare tracked sports data received from multiple sources.

BACKGROUND OF THE INVENTION

Sports analytics is a space that continues to see a lot of growth. In particular, various artificial intelligence and machine learning processes are being utilized to ascertain a variety of new trackable statistics including how far a player has traveled in a given game or on a given play. The amount of energy being exerted. Techniques regarding running, jumping, hitting, dribbling, shooting, skating and so forth.

Various wearable devices have been developed over the years to sense and gather data associated with various physical activities. For example, a pedometer is one of the earliest forms of a wearable device that could calculate the number of steps an individual has taken. These devices have advanced with improved sensors, accelerometers, gyroscopes, heart rate monitors, and so forth.

Video is a powerful tool in sports. It provides a visual context for actions, motions and athlete/team performance. The medium of video is used at every level of enjoying sports and developing players and teams, from youth through college to the professional leagues. However there has always existed a need to save time by reducing full-length video down to just the key moments of interest. For example, this could be the moment a particular player is in action (e.g., skating on the ice) or the moment a goal or basket is scored.

There is a desire to improve upon techniques of gathering, aligning and conveying data in multiple formats and from multiple sources in a platform quickly while operating in a manner that is mindful of battery, memory, human and other resources.

The present application seeks to solve some of these identified problems as well as other problems that will become apparent to those skilled in the art.

SUMMARY OF THE INVENTION

The present application relates to an artificial intelligence (AI) sports recognition engine capable of identifying specific motions or actions of a sport or activity, coordinating the communication and time coordination among the various sports detection devices used, as well as time-align sensed data indicative of sports action from the sports detection devices to be time-aligned with video associated with the sports session. Once aligned the intelligent system can then automatically generate a variety of edited videos based on an input query.

In one embodiment a method of coordinating time on a plurality of sports detection devices comprising the steps of broadcasting a global time stamp signal to a plurality sports detection devices; generating on each sports detection device a session identification number based on the broadcast global time stamp, wherein the session identification number is associated with a sports session; generating a plurality of local time stamps in response to the generated session identification number; receiving sensed data by the sports detection device and determining whether a sports action has occurred; and associating a local time stamp with each determined sports action.

The sports detection device used can be comprised of: a sensor array system having a plurality of sensors and an AI recognition engine; at least one CPU or MCU; memory, antenna; and a power source. The AI recognition engine can be configured to receive sensed data from the plurality of sensors from an associated individual performing sports actions and identify from the sensed data using an action detection model a specific sports action.

Additional steps to the above embodiment can include receiving video data associated with the sports session, wherein the video data includes a global time stamp. It can also include time aligning the video data with each determined sports action. In some variations the method above can automatically edit the time aligned video to portions wherein a determined sports action occurred. This can further include automatically editing the time aligned video further to portions wherein a particular individual associated with the determined sports action occurred.

In some variations to the embodiment above a mobile computing device can be used to send a connectionless signal indicating a timed-trial mode is initiated to one or Sports Detection Devices.

Another set of steps that can be included in this method of coordinating time data on a plurality of sports detection devices comprises: monitoring by the sports detection device for the beginning of a sports action to be timed; identifying by the sports detection device the ending of the sports action to be timed; and sending the timed sports action from the sports detection device to a computing device.

Another step can include generating one of the following commands: start, stop, update, timed-trial and annotation. In some variations the sports detection devices can receive from an annotation device (or a mobile computing device) an annotation command.

The annotation command can further include inputting into a wireless device one of an audio input, visual input, and pre-determined marker to be associated with the local time stamp and configured to be retrievable later with the associated sensed data at or around the moment of the annotation command.

The mobile computing device can continue to periodically broadcast a signal during the sports session that includes the original global time stamp sent and a local time offset. This allows any sports detection device receiving the periodically broadcast signal after the original broadcasting of the global time stamp to then be associated with the same sports session. The global time stamp can be in UTC form and the local time offset can be in 1 second increments from the original global time stamp.

In addition to coordinating time data on a plurality of sports detection devices, the system can receive multiple sets of video data each having a global time stamp from a plurality of video sources associated with the sports detection session. Then each set of video data can be automatically time-aligned to the sensed data from the sports detection device.

In another embodiment, once the sports sensed data is captured with a global time stamp and video data is also captured with a global time stamp, intelligent video editing methods and outputs can be accomplished. For example, in one process of generating edited video the steps can include: receiving an input query, identifying sensed data based on the query, automatically time-aligning the identified sensed data to the video data, and generating an output of the time-aligned identified sensed data and video data in response to input query.

The input query can include any of: type of sports action, player, play sequence, sports session, and type of video data. The input query can also include parameters about the type or style of output video, as well as utilization of various video data. This input query can include associating a player with a player profile, wherein the player profile is associated with one or more sports detection devices.

In yet another embodiment a computer implemented method of generating spliced sports video clips comprising the steps of: receiving an input query, wherein the input query includes at least one of: a request about a player, a sports session, and type of sports action; identifying sensed sports data based on the input query from a sensed sports data database; identifying video clips based on the identified sensed sports data from a video data database, wherein each set of video data associated therewith has an associated global time stamp; automatically splicing the identified video clips into an edited video.

The computer implemented method of generating spliced sports video clips can also utilize sensed sports data associated with a sensed sports data database that is generated from a plurality of sports detection devices. Each sports detection device can be configured to determine when a particular sports action has occurred.

Similar to the other embodiments, each sports device can be associated with a particular player profile during a sports session, and wherein each sports session is initiated by broadcasting a global time stamp.

This embodiment can further include the step of automatically annotating the edited video based on the input query. The annotating can include at least one of type, length, and measured data associated with a given sports action. For example, the velocity of a slapshot or baseball hit and the distance traveled.

In yet another variation to the embodiment the step of displaying the generated edited video is performed. This displayed video can then be used to analyze various sports actions to generate training and other improvement protocols and strategies.

In yet another embodiment an intelligent video and data generation system comprises: an interface configured to receive an input query including parameters about a sports action; a sensed sports data database, having sensed sports data generated from a plurality of sports detection devices, each sports detection device having an AI recognition engine integrated therein and configured to receive a command including global time stamp information; a video data database, wherein the video data includes global time stamped information; and a processor configured to time align the sensed sports data and the video data based on the global time stamp.

The processer can be used to identify relevant video data based on the input query and the time-aligned video data and sensed sports data. The processor can further generate a spliced video for viewing of the relevant video data. Similar to other embodiments the input query can include various parameters about video data and sensed sports detection data.

This intelligent video and data generation system can further include the step of identifying and generating a video.

In yet another embodiment, a method of communicating with a plurality of sports detection devices comprising the steps of: broadcasting from a mobile computing device a command that includes a global time stamp as part of the command to a plurality sports detection devices; generating on each sports detection that received the command device a session identification number based on the broadcast global time stamp, wherein the session identification number is associated with a sports session; generating a plurality of local time stamps in response to the generated session identification number; sending an outbound broadcast from each of the plurality of sports detection devices indicative that each received the broadcast command from the mobile computing device; rebroadcasting the command periodically from the mobile computing device; and receiving by at least one additional Sports Detection Device the rebroadcast command or the outbound response, and generating the associated session identification associated with the sports session on the additional Sports Detection Device.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A-B illustrate electronics block diagrams with an AI recognition engine functional block for use with a Sports Detection Device;

FIGS. 8A-D illustrate various processing block diagrams for generating an intelligent sports video from video source(s) and AI recognition events;

FIGS. 10A-E illustrate key elements of various broadcast commands including Team ID information;

DETAILED DESCRIPTION OF THE INVENTION

Figure 1A:
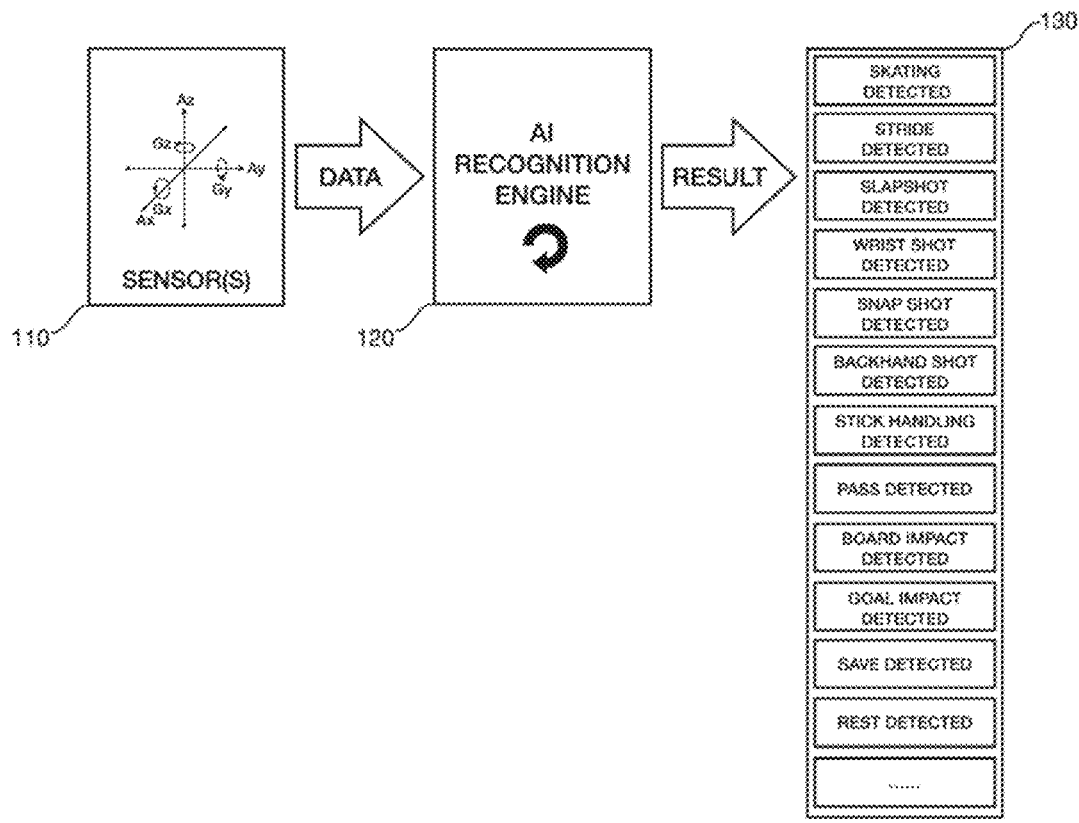
FIG. 1A illustrates a processing block diagram for an AI recognition engine that uses sensor data input and produces a pre-defined recognition result.

Traditional methods of editing sports video for analysis and training purposes can be cumbersome, take a lot of man resources, and time to produce. One of the problems the inventors of this application are seeking to solve is a way to automate this traditional manual video editing process through use of utilizing Sports Detection Devices that include AI recognition engines to identify sports actions.

This sensed data once aligned with corresponding video data of the same sports session can allow for an intelligent input query system to rapidly identify various paraments and generate a desired spliced or edited video based on the input query.

Another problem to be solved is how to communicate and ensure a plurality of Sports Detection Devices are configured in a manner such that they can be aligned quickly and consistently. Some of the solutions include and more will become evident below is using a mobile computing device, such as a smartphone, to broadcast commands that include a global time stamp, which then can be used be each of the plurality of Sports Detection Devices to aligned and associated with a particular sports session. Other problems to be solved include ensuring that all of the desired Sports Detection Devices are receiving the various commands, and solutions for those are provide below. Again, these are a few problems and others are solved by the inventors of these embodiments described in the description below.

To provide clarity, the applicants would like to provide context around certain terms used throughout this description that is in addition to their ordinary meaning.

Artificial Intelligence (AI) recognition engine 100 is used to determine a sports action using a configurable processing node(s) that are configured to have machine learning or other AI methods or models encoded therein. In some variants, additional context-specific data processing methods or models can also be encoded therein and be a part of the AI recognition engine. This AI recognition engine can be part of a Sports Detection Device.

A Sports Detection Device can include a sensor array system, memory, a MCU or CPU, antenna, and power. The sensor array system can include one or more sensors as well as the configurable processing node(s) that form part of the AI recognition engine 100. It can be implemented into various wearable devices or other sports related equipment, such as smart hockey pucks. These devices can also include wireless communication components for receiving and transferring data.

An Action Detection Model (ADM) can be a training model that can be encoded onto the AI recognition engine.

A secondary computing device can include a computing device with higher processing power and generally increased memory capacity over that of a Sports Detection Device. Examples include tablets, laptops, desktop computers, cloud-computing and even smartphones.

Data Mining or Pattern Recognition methods can include various algorithms and techniques used to take tagged data, identify a pattern associated with the tagged data, so that additional data can be reviewed to identify other instances that are similar to the tagged data. For example, if the tagged data is indicative of a particular sports action, such as a skating stride or slapshot, the data mining and pattern recognition techniques can be used to identify other instances in recorded data where another skating stride or slapshot has potentially occurred.

A Supervised Learning Algorithm is configured to use to tagged data, other identified sports action data, parameterization inputs, false sports action data, and profiler feedback to generate a training model or Action Detection Model for use with the AI recognition engine. This supervised learning algorithm can consist of an outcome variable (or dependent variable) which is to be predicted from a given set of predictors (independent variables). Using these set of variables, it can generate a function that maps inputs to desired outputs. The training process continues until the model achieves a desired level of accuracy on the training data. Examples of Supervised Learning algorithms include Regression, Decision Tree, Random Forest, KNN, Logistic Regression, etc.

Parameterization inputs can include various parameters including minimums, maximums, statistical parameters, types of sensor data, for use with creating the ADM.

Data tagging or tagged data includes identifying a specific sports action in the sensed data. This can be done by a profiler, who is reviewing time-aligned video and sensed data.

A profiler can be an individual who can identify a particular sports action, which can include a wide number of physical feats performed by an individual, such as an athlete. Sports action types include skating, shooting, hitting, throwing, jumping, running, blocking, dribbling, and so forth.

Sensed data can include data that is gathered by a Sports Detection Device and can include acceleration across multiple axes, rotational motion across multiple axes, magnetic field sensing across multiple axes, temperature readings, pressure readings, impact readings, RFID feedback, signal feedback, and so forth.

Video data can include visually recorded data of an athlete performing a specific sports action. Both sensed data and video data can include timestamps for alignment.

A Sports Detection System can include one or more Sports Detection Devices, one or more video recording devices, one or more secondary computing devices, and one or more profilers or any combination thereof.

A Sports Session can be a time period over which a set of sports actions are performed, for example a practice, game, skills training, or combination thereof.

Sports Session ID can be a unique identifier for a Sports Session that distinguishes it from other Sports Sessions.

Connectionless Broadcast can include the process of transmitting information wirelessly without forming a protocol connection. For example, in Bluetooth this is the process of wirelessly advertising information without forming a direct wireless connection.

Broadcast Command can include a wirelessly transmitted action or state transition to be performed by a Sports Detection Device.

Session Start Command can include a broadcast command to one or more Sports Detection Device(s) to start a Sports Session.

Session Update Command can include a periodic broadcast command to one or more Sports Detection Device(s) to maintain the status and timing of the Sports Session.

Session Stop Command can include a broadcast command to one or more Sports Detection Device(s) to stop a Sports Session.

Session Annotation Command can include a broadcast command to one or more Sports Detection Device(s) to associate a specific annotation to a moment in time.

Timed-Trial Command can include a broadcast command to one or more Sports Detection Device(s) to perform a time measurement for a sequence of sports actions.

Time Coordination can include a process of establishing a global timing amongst one or more Sports Detection Device(s) that can be used for aligning events detected on Sports Detection Device(s) in the future.

Time Alignment can include a process of taking multiple data sources (e.g., recognition events for Sports Detection Device and video from video source(s)) and synchronizing data based on one or more global time stamps.

Global Time Stamp can include a common point in time that is referenceable based on a common time system (e.g., Coordinated Universal Time or UTC).

Session Seconds Offset can include a time counter that is incrementing throughout a Sports Session from the start of the Sports Session to the end of the Sports Session.

Sports Coordination Device can include a device used in the operation of a Sports Session. For example, this could include a scorekeeping device, a timekeeping device, and a video capture device.

Various Sports Action Detection Methods will be further described below and can implement many of the items noted above as well as various steps.

As semiconductor sensing technology matures there are increasing advancements for integrating dedicated processing nodes close to semiconductor sensing elements. These processing nodes are configurable to be encoded with machine learning methods and other artificial intelligence (AI) methods. Traditional smart or embedded products that can sense or measure motions of a sport or activity suffer from memory limitations whereby an on-board application processor records data from sensors and possibly implements some algorithm(s) (e.g., digital filter), but ultimately these products are limited by on-board memory or processing limitations. The memory limitations typically result in requirements to maintain connectivity or proximity to a mobile device (e.g., smart phone, tablet) or data link (e.g., Bluetooth, Wi-Fi, LTE) in order to not exceed on-board memory. The processing limitations result in limited on-board algorithmic capabilities which in turn limits overall functional intelligence of such traditional smart or embedded products.

However, some of the embodiments herein utilize the integrated, dedicated and configurable processing nodes close to semiconductor sensing elements to solve the limitations noted above. These processing capabilities can be configured to implement training models for identifying specific sports actions. By integrating this level of functional intelligence into a smart product, a Sports Detection Device is realized, and large amounts of sensor data can be reduced to a substantially smaller number of pre-defined recognition outputs, freeing up valuable resources of the on-board application processor. The smaller number of pre-defined outputs is more suitably stored in on-board memory, and the dedicated processing node offloads the primary on-board application processor (e.g., CPU/MCU) which reduces the dependence of the product on outside devices or data links to circumvent on-board memory or processing limitations. This also can increase battery life of the Sports Detection Device. The Sports Detection Device implements Action Detection Models that can determine multiple types of sports actions.

Figure 1B:
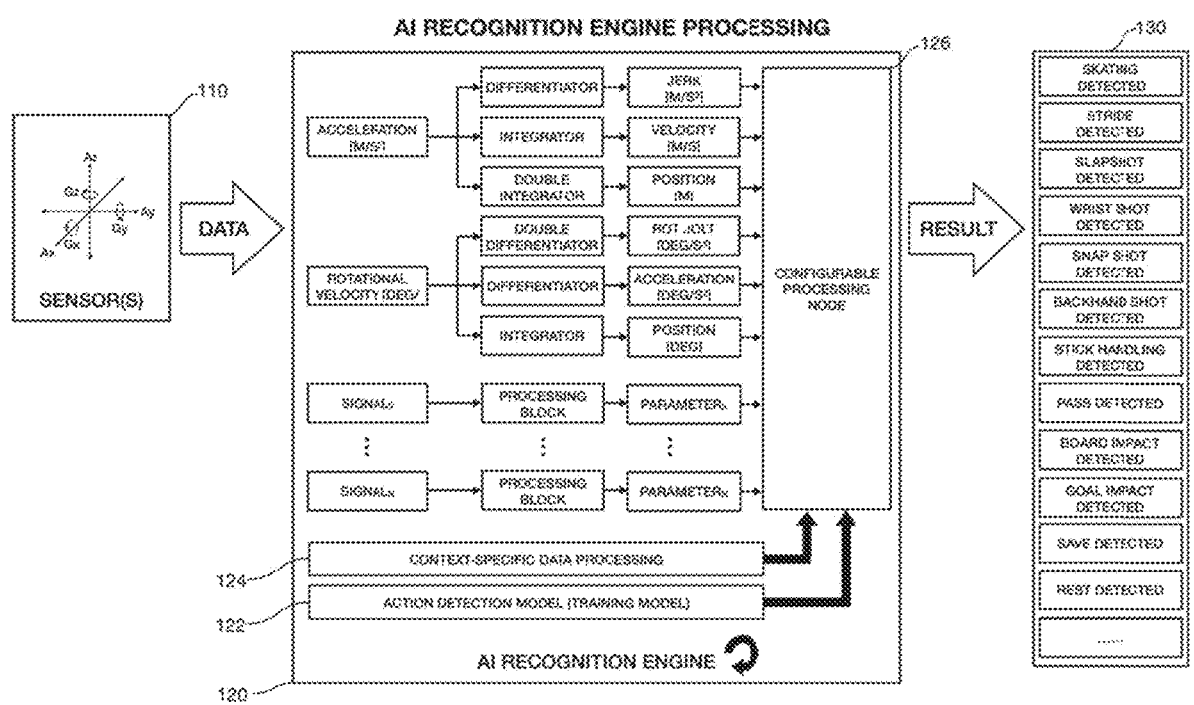
FIG. 1B illustrates a processing block diagram for the AI recognition engine of FIG. 1A with further details on the inside of the recognition engine.

An example of sensor or sensor array 110 configured to detect multiple types of inputs is shown in FIG. 1A and FIG. 1B from sensors having 3 axis of acceleration inputs and 3 axis of rotational velocity inputs. If the main application processor were powerful enough it could do more complex analysis onboard, but then limitations in power from a battery source become a limiting factor. Thus, as described in part above, an efficient and effective ADM is needed to compensate for the limitations of onboard memory, required connectivity or proximity to a mobile device or required data link, processing and power for a sensing device.

For purposes of this application Sports Detection Devices or smart devices can be integrated into sports equipment such as pucks, balls, and bats (some examples shown in FIGS. 5A-C) as well as into wearable devices (an example shown in FIG. 4A-B) that can be worn by a player or integrated into gear worn by a player including jerseys, pads, helmets, gloves, belts, skates and so forth. The Sports Detection Devices are configured to capture data associated with a motion or action associated with a player, such as the data associated with a skating motion or action of an ice hockey player.

Figure 7:
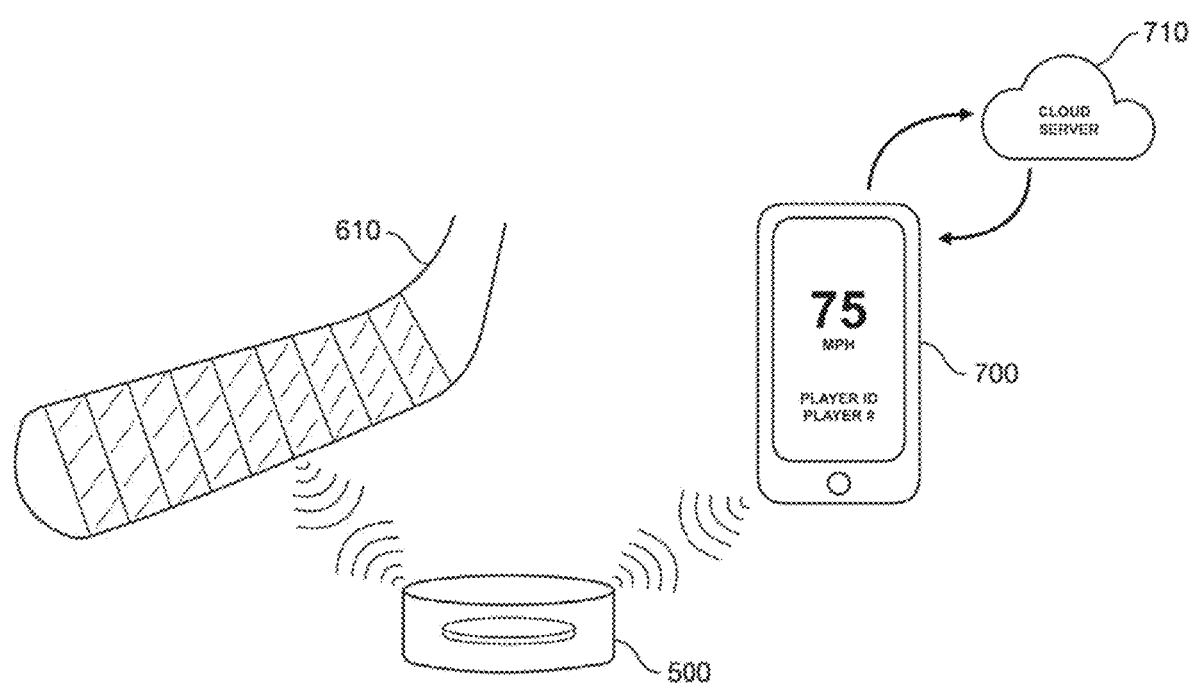
FIG. 7 illustrates various components of a Sports Detection System.

The sensor array 110 can capture data such as acceleration, rotational velocity, radar signature, RFID reads, pressure and temperature readings. The data can be stored in the memory and later transferred to a secondary computing device (700, 710). The secondary computing device may be a laptop computer, a desktop computer, a local server, a smart phone, a tablet, or a cloud server, such as shown in FIG. 7. The data can also be pre-processed, analyzed or filtered utilizing the ADM prior to storing in memory to utilize the capabilities of the ADM to reduce memory footprint.

In one embodiment, sensor data is captured by the sensor array and sent to the artificial intelligence (AI) recognition engine that includes an ADM to determine a sports action performed by the player, such as a skating action. FIG. 1A illustrates a processing block diagram for the AI recognition engine 120 that uses sensor data input and produces a pre-defined recognition result 130. The pre-defined recognition results 130 can be categorized into various specific sports actions, such as shown in FIG. 1A, but not limited to: skating detection, stride detection, slapshot detection, wrist shot detection, snap shot detection, backhand shot detection, stick handling, pass detection, board impact detection, goal impact detection, save detection, rest detection, being-checked detection, and so forth.

FIG. 1B illustrates the processing block diagram of FIG. 1A with further details on the inside of the AI recognition engine 120. The sensor data received from the sensor array 110 may include acceleration, rotational velocity, magnetic field strength, radar signature, RFID reads, pressure and temperature. The sensor data is then mapped as one or more signals into one or more processing blocks that produce one or more parameter outputs in the AI recognition engine 120. For example, the acceleration sensor data could enter into processing blocks that include a differentiator, an integrator, or a double integrator. Theses processing blocks would produce parameters such as jerk, velocity, and position of the sensor respectively. The rotational velocity sensor data could enter into other processing blocks that include an integrator, a differentiator, and a double differentiator. These processing blocks would produce parameters such as position, rotational acceleration, and rotational jolt of the sensor respectively. The same or additional data can be entered into additional processing blocks to determine additional parameters. The parameters are then processed and compared to the ADM (training model) 122 by a configurable processing node 126 to determine a sports action associated with the determined parameters over the time period of interest. The configurable processing node 126 is set to match specific parameters or data with specific sports actions in the ADM. The AI recognition engine results are improved by a context-specific data processing model 124. The context-specific data processing model 124 can function as an additional layer to provide better accuracy to the ADM. For example, the context-specific data processing model 124 can provide fixed boundaries or limitations for certain sports actions, whereas the ADM might still consider those or not appreciate the order of operations. One specific example includes detecting skating strides. The ADM might detect sequential skating strides, and output right stride, left stride, left stride, left stride, right stride. The context-specific data processing model 124 would recognize that there is a sequential order to the strides and override what the ADM perceived as 3 left strides in a row to modify the middle left stride to a right stride. Thus, in combination the ADM 122 and context-specific data processing model 124 can more accurately output identified sports action results 130.

Figure 2:
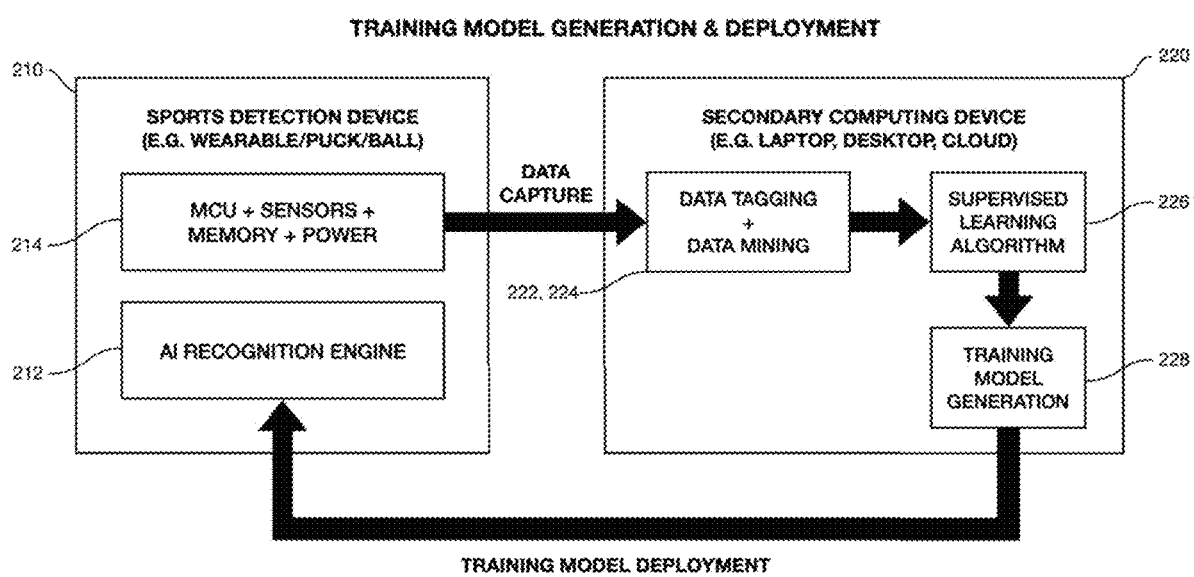
FIG. 2 illustrates the process steps for generating a training model for use with an AI recognition engine.

FIG. 2 illustrates an embodiment for a process 200 of generating or updating an ADM (training model) 228 that is used by the AI recognition engine 212. A Sports Detection Device 210 that is associated with an individual is placed on or in sports equipment or gear and collects data using the embedded electronics 214, which includes power, memory and sensor array, as well as the AI recognition engine 212. This collected data that can be raw sensor data or pre-filtered by the AI recognition engine is sent to a secondary computing system 220 that can include other processing devices, such as computers or cloud-based computing devices. The collected data can then be tagged 222 for instances of a specific sports action identified and data-mined 224 using the tagging to identify additional instances in the collected data of the sports action. This data tagging 222 and data-mining 224 output can then be sent to a supervised learning algorithm 226 or machine learning or other AI methods that generates or updates an ADM (training model) 228. The ADM (training model) 228 is then deployed and utilized to update the AI recognition engine 212 onboard the Sports Detection Device 210 to distill the sensor data received to a specific sports action that is again stored in memory and can then be sent again to secondary computing for further refinement as noted. It should be noted that the data tagging can be performed by a profiler. The parameterization input can also be performed by a profiler, user, or data-scientist. The data tagging can be aided by data mining and pattern recognition techniques, which help expedite the data-tagging process.

Figure 3B:
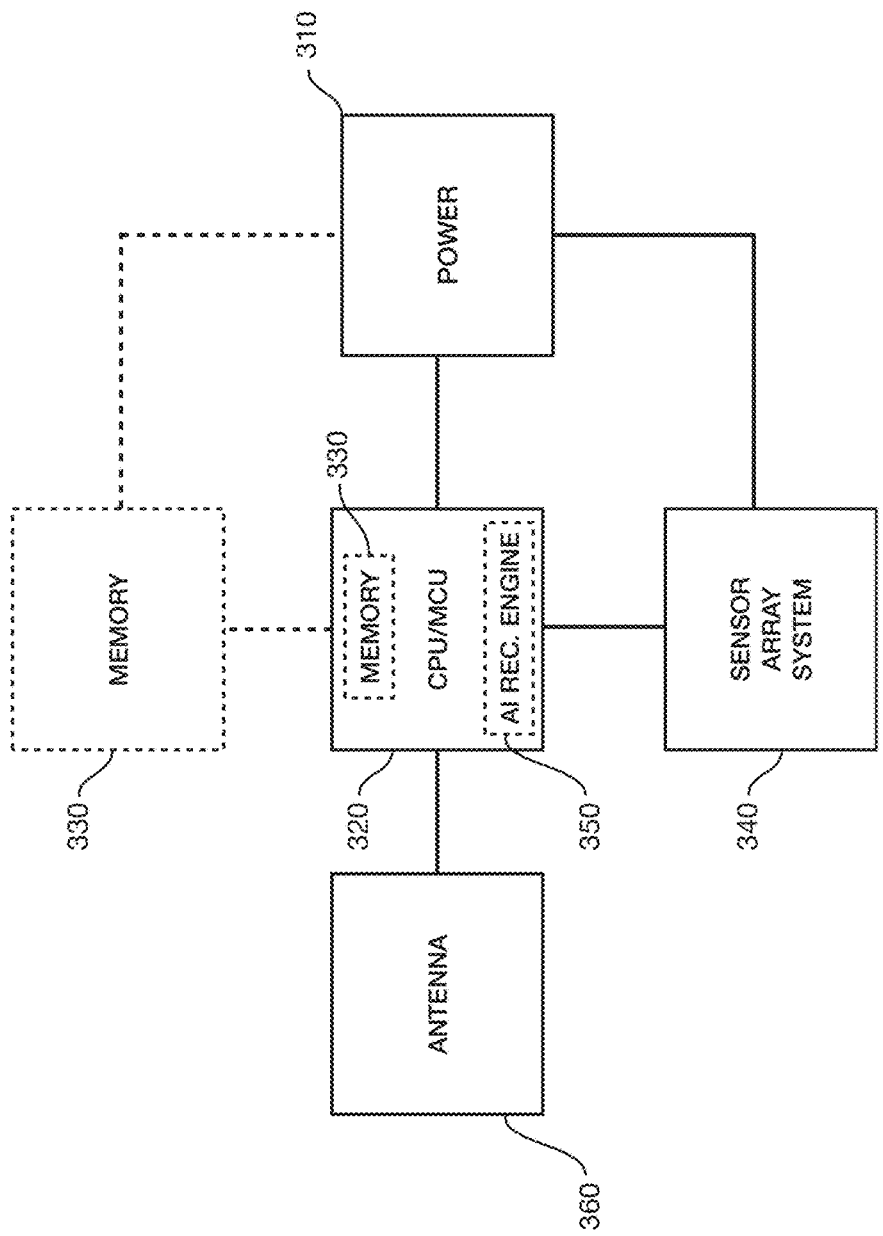

FIGS. 3A-B illustrate electronics block diagrams with an AI recognition engine functional block 350, which can be integrated into a Sports Detection Device. As shown, in one configuration a sports detection device electronic block 300A includes a power supply 310, microprocessor (MCU) or CPU 320, one or more sensors that can be part of a sensor array system 340, memory 330, AI recognition engine 350 that is comprised of processing nodes configured to run an ADM 122 and/or Context-Specific Data Processing Model 124, such as shown in FIGS. 1A-B, and antenna 360. As shown in 300A, 350 is integrated directly into the sensor array system 340. Memory 330 can be optionally integrated with the CPU/MCU 320 or configured separately. Alternatively, as shown in Sports Detection Device electronic block 300B, the AI recognition engine 350 can be integrated with the CPU/MCU 320. However, integrating the AI recognition engine directly into the sensor array system is preferable if it offloads processing load, power consumption and demand from the CPU/MCU. The antenna 360 can be utilized to receive connectionless commands, form a connection to a secondary computing device and also transmit information, such as sensed data associated with a sports action. The antenna 360 can be comprised of one or more types of antennae and be able to wirelessly communication across several types of wireless signals including BLUETOOTH, Wi-Fi, NFC, cellular and other types of radio signals known in the art.

Figure 4A:
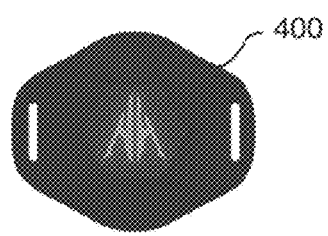
FIG. 4A illustrates a smart wearable with an embedded AI sports recognition engine.
Figure 4B:
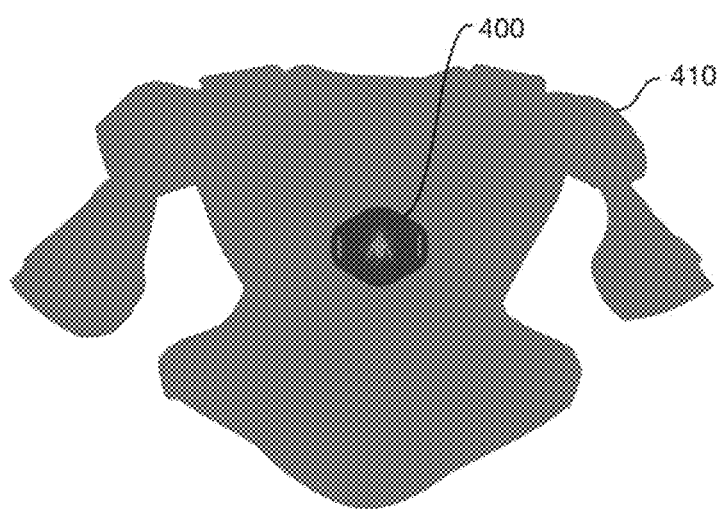
FIG. 4B illustrates an example placement and mounting location of the smart wearable of FIG. 4A on protective shoulder pads.

FIG. 4A illustrates a smart wearable or Sports Detection Device 400 with an embedded AI sports recognition engine. This device 400 can be placed or mounted in various locations including on protective shoulder pads 410 worn by a hockey player.

Figure 5A:
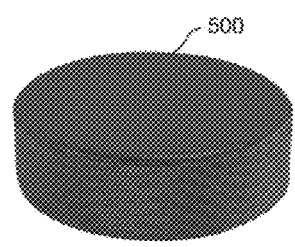
FIGS. 5A-C illustrate various views of a smart hockey puck with an embedded AI sports recognition engine.
Figure 5B:
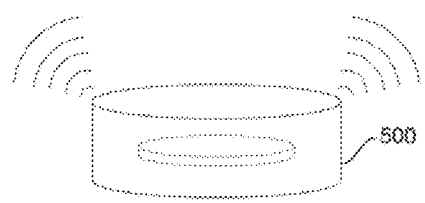
Figure 5C:
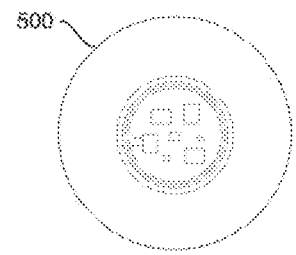

FIGS. 5A-C illustrate various views of a smart hockey puck 500, which is another form of a Sports Detection Device that can include an AI recognition engine with an ADM embedded therein that is configured to be generated and updated using the methods described herein.

Figure 6A:
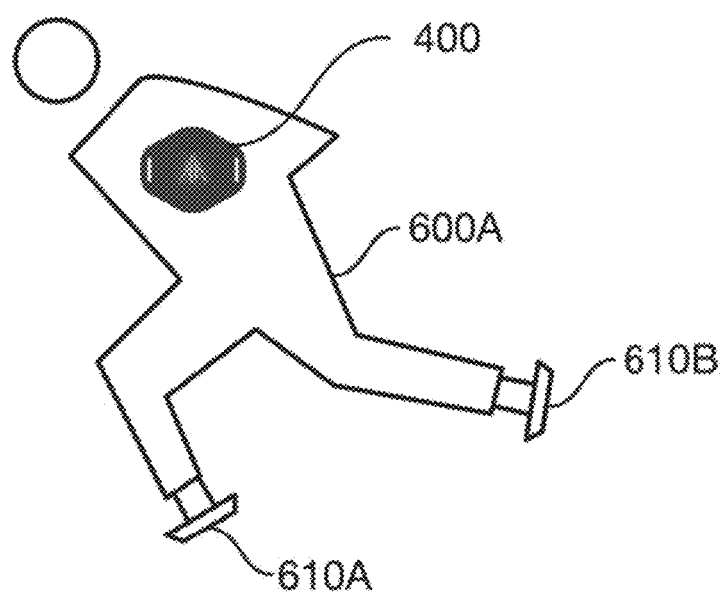
FIGS. 6A-B illustrate various individuals performing sports actions while using Sports Detection Devices having an AI recognition engine embedded therein.
Figure 6B:
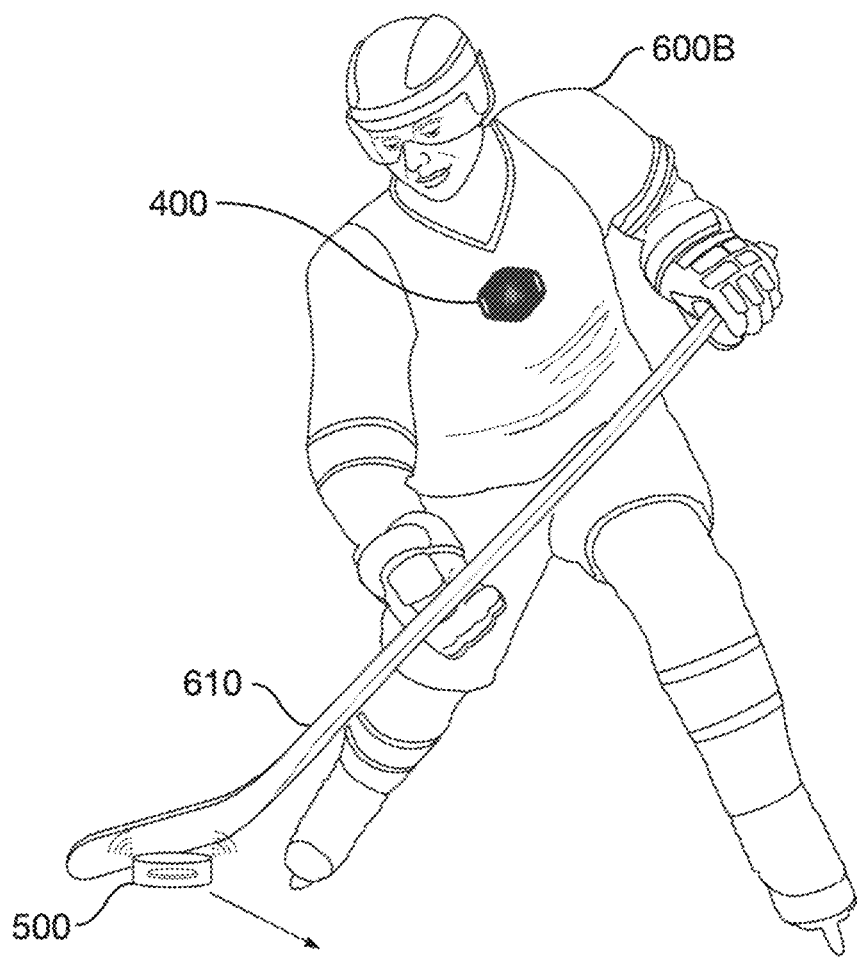

FIGS. 6A-B illustrate various individuals/athletes using Sports Detection Devices 400 and 500 having an AI recognition engine embedded therein. In FIG. 6A the individual 600A can use the device 400 to determine when a stride using skate 610A or 610B occurs. The skating data can be aligned with video and used later for analysis in coaching and training sessions, which is another purpose of acquiring accurate sports action data through the Sports Detection System and methods described herein.

FIG. 6B illustrates a hockey player 600B wearing a device 400 and also using a device 500 with hockey stick 610. When the ADM is appropriately embedded in the AI recognition of device 400 or 500 it will be able to determine when a slapshot occurred as well as all of the data associated with the given slapshot. Once aligned with video data, the system can produce each slapshot for visual inspection as well as the corresponding data associated therewith. For example, rotation, speed, contact time with the blade of the hockey stick and so forth.

FIG. 7 illustrates various components of a Sports Detection System including, in this particular case, a smart hockey stick 610, smart puck 500, which transmits information to a secondary computing device 700 (here shown as a smartphone), which can further process and communicate with another secondary computing device 710, such as cloud-computing resources.

Figure 8A:
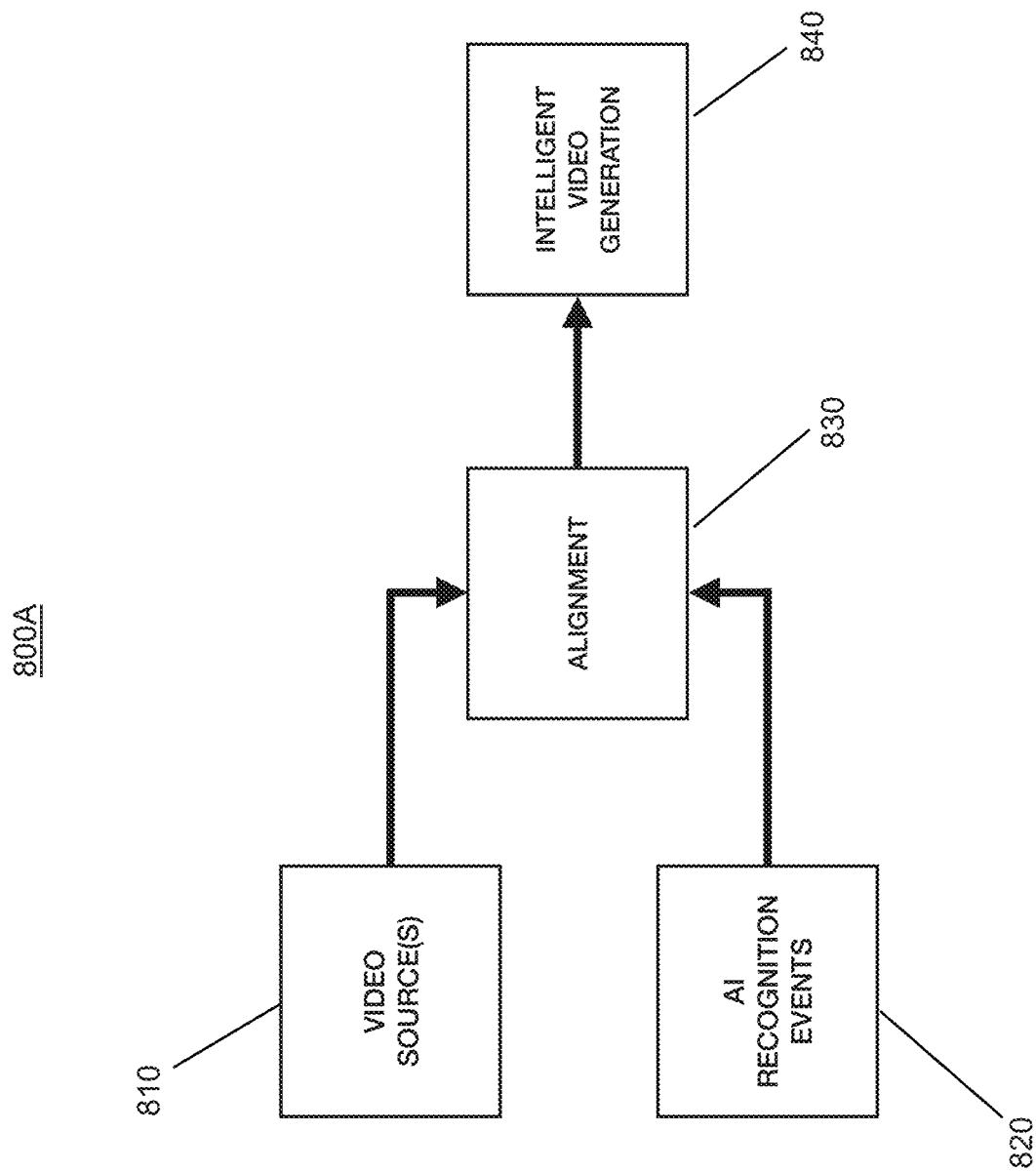

FIG. 8A illustrates a processing block diagram 800A for generating an intelligent sports video from video source(s) 810 and AI recognition events 820. In this case the video source(s) 810 can include raw video or sets of video segments that do not include additional intelligence derived from the video frames. This approach requires the least amount of additional processing resources on the video source(s) and leverages the intelligence from the time-stamped AI recognition events. Following the alignment step 830 the intelligent video generation step 840 is used to output one or more particular video segments of interest. For example, the intelligent video generation step 840 can be used to splice a full-length sport video into just the segments in time when a player is on the ice or playing field actively playing and remove the segments in time when the player is resting or on the bench. In this example, the time-stamped AI recognition events from the smart wearable or Sports Detection Device 400 (e.g., stride detected, shot detected, etc.) provide the necessary information to splice or cut the full-length video into the sub-segment of only playing time. These sub-segments can be tagged with an AI recognition tag that is derived from the type of AI recognition event detected, logged and communicated in the smart device. These sub-segments can be broken down in several ways including limiting instances where a specific player takes a slap shot, or all the instances players on a particular team took slap shots, instances of saves for an individual or team, and various other filtered requests that pertain to isolating and compiling video surrounding specific sports action that have been detected using a Sports Detection Device. If multiple video sources, each using varying angles or zoom levels, then those could also be spliced together to show the various views of a particular sports action back-to-back or alternatively spliced to be viewed in the form of grid or other arrangement showing the multiple views simultaneously. Certain sports actions can even have the actual time of the sports action shown in video automatically slowed down to illustrate and analyze the mechanics of the given sports action. Various other editing techniques can be implemented for the output, many of which are enabled once the sensed sports action data becomes aligned with video data of the particular event.

One of the processing shown in FIG. 8A is that, particularly in the case of team sports, the video sub-segments can be known to accurately include the player of interest, but there will likely be other players or actions in the video frames that the observer/viewer must filter out to correctly identify the player or individual of interest.

Figure 8B:
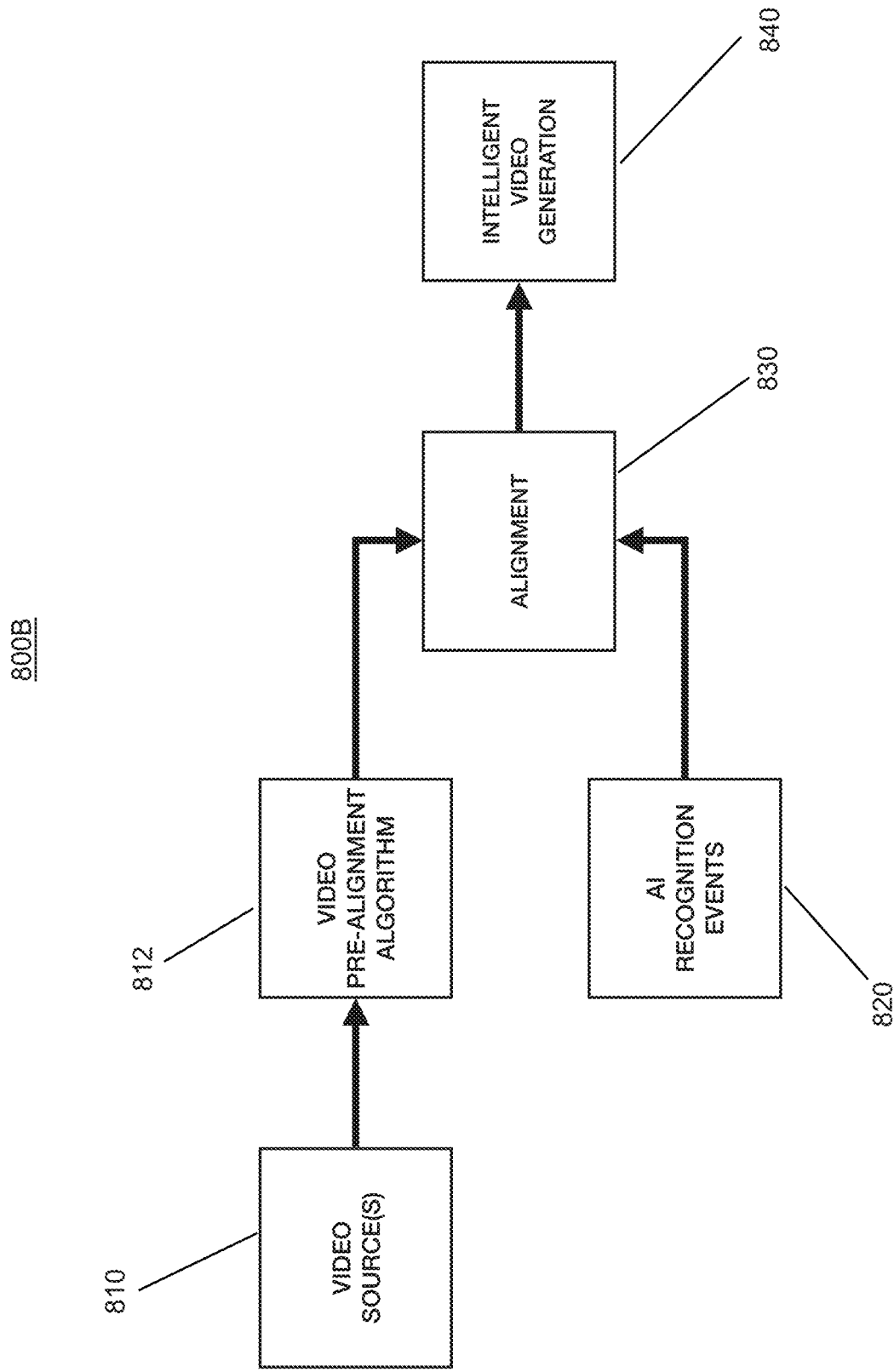

FIG. 8B expands on FIG. 8A and illustrates a processing block diagram 800B for generating an intelligent sports video from video source(s) and AI recognition events with a pre-alignment video algorithm 812 applied to the video source(s) 810 before the alignment step 830 with AI recognition events 820. In this embodiment 800B the post-processed video source, rather than simply the raw video source, is merged with the time-stamped AI recognition events 820 from the smart device to create additional capabilities to add intelligence to the video. One advantage of adding this additional video processing step before the alignment step is that additional intelligence can be derived from the source video. For example, the pre-alignment video processing algorithm can apply a deep learning approach like human pose estimation, which is used to determine, identify and track the human joints (key points) of all of the players or individuals in a video frame. In a single video frame, where multiple players are shown and/or moving this information can be used to track the location of the players or individuals on the ice or playing field.

There are also varying levels of tracking that can occur from frame-to-frame. For example, by locating the key joints (i.e., hip, knee, ankle) of a set of hockey players on the ice during a practice or game and tracking the relative movement of those joints from frame-to-frame, a video algorithm can generate its own AI recognition events (e.g., player taking a stride, player taking a shot, goalie making a save, etc.). This process generally is time-consuming and can use a lot of processing resources. By identifying joints, for example, and coupling that with known players in a given video frame, the association of the player to the identified joints can more readily be associated, thus reducing processing time. In particular, if a given player in a video frame is the player taking the identified slapshot then overlaying that AI sensed information and associated player profile with that player's identified human joint profile can be used to isolate the player in that video frame as well as other analyzed video frames where multiple players or persons exist. Thus, reducing some of the processing time needed by the video processing algorithm.

As noted, the additional video processing step in FIG. 8B allows for increased options and capabilities after the alignment step during the intelligent video generation step. For example, when aligning the output of the video pre-alignment algorithm, which includes video-derived timestamped AI recognition events, with the AI recognition events from a smart device, in addition to splicing or cutting the full-length video into sub-segment containing a given player or individual of interest, those sub-segments can be automatically labeled with a visual marker indicating one or more players or individuals of interest. The visual marker could be a pointer, highlighted portion, outline, or other type of visual identifier. In this example, the person viewing the intelligently derived video is given a clear indication of where they should focus their eyes and attention.

Figure 8D:
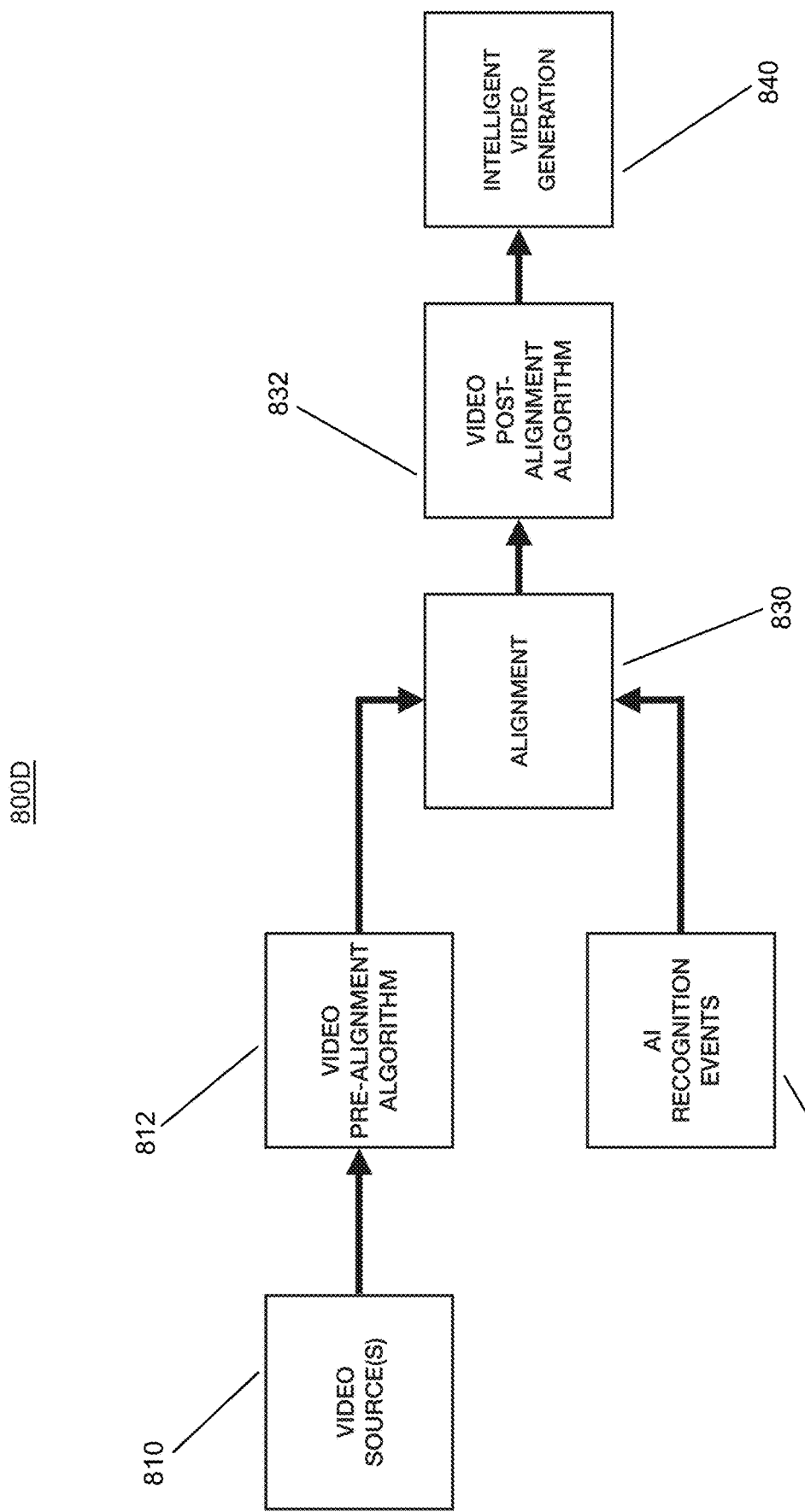

The relative tradeoffs of the processing approaches shown in FIG. 8A and FIG. 8B relate to the amount of processing time and computing resources available for an application. For example, the processing shown in FIG. 8A does not require a high-performance camera as the video source(s) and does not require the video to be processed by a computer vision (CV-)-based deep learning (DL) algorithm before the alignment step. This approach is computationally inexpensive, can leverage existing cameras that are most commonly available and depends on the intelligence of the AI recognition events generate inside one or more Sports Detection Device(s) to generate a more intelligent sports video. Comparatively, the processing shown in FIG. 8B does require higher performance camera and computing resources to create one or more video source(s) that are suitable to run a pre-alignment algorithm. The processing in FIG. 8A therefore lends itself to more real-time or during practice/game-play applications, while the processing in FIG. 8B lends itself to post-practice/game applications. There are some cases where the video pre-alignment algorithm shown in FIG. 8B is performed after the alignment step, such as shown in FIG. 8C. 800C is an example of having this type of algorithm being applied post alignment 832. FIG. 8D shows that there is the possibility of a pre-alignment algorithm of the event 812, and then a post-alignment algorithm 832, this in turn leads to the generation of a video segment. 800D is the ability to have pre and post alignment algorithms produce an intelligent video generation.

Figure 9A:
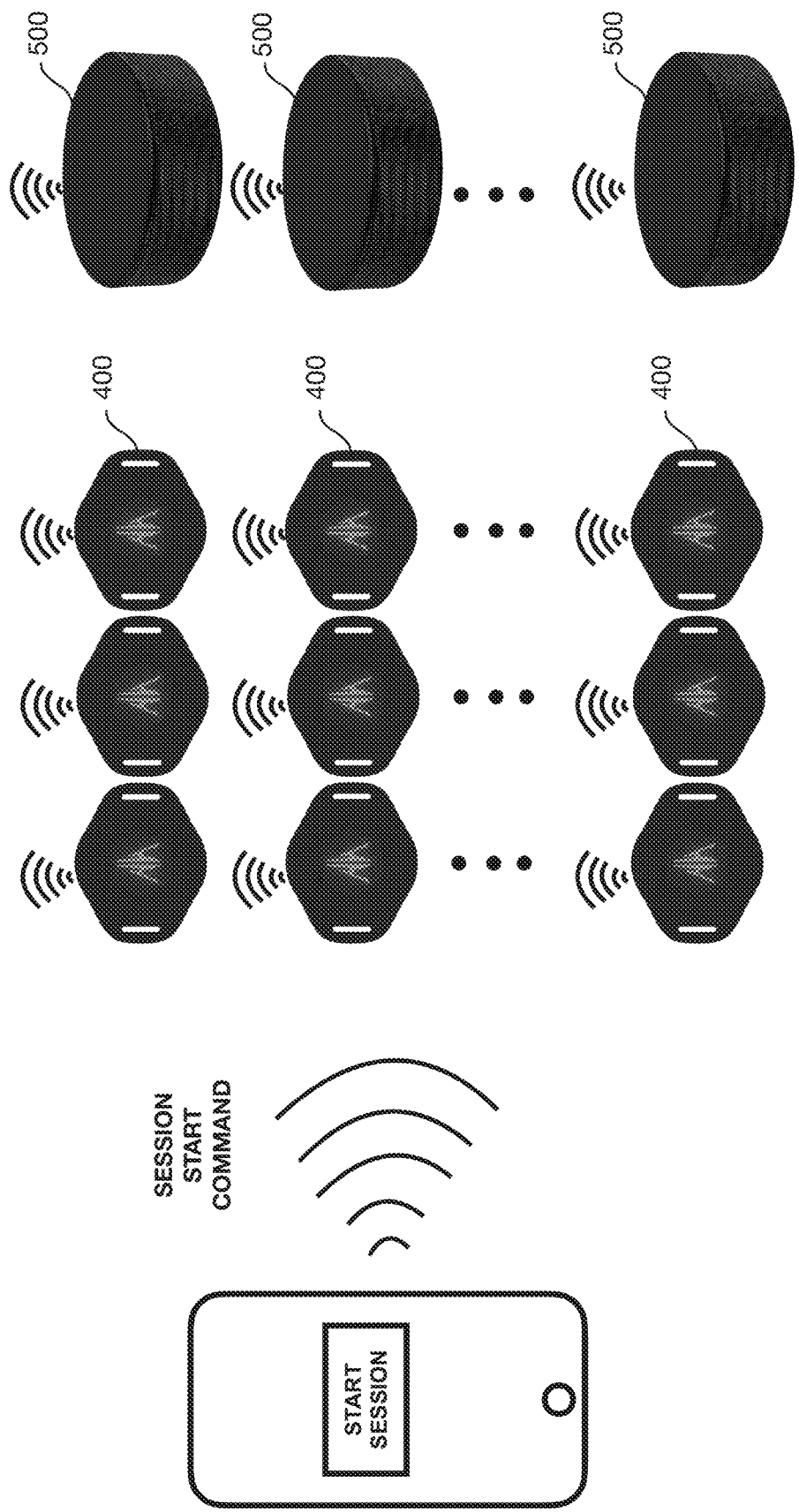
FIGS. 9A-E illustrate various commands broadcast to a plurality of Sports Detection Devices.

FIGS. 9A-E illustrate various commands made via a connectionless broadcast to a plurality of Sports Detection Devices. In FIG. 9A a start session command and timestamp are wirelessly transmitted from a mobile computing device (i.e. smartphone, tablet, laptop) to one or more Sports Detection Devices (400, 500) that are capable of generating AI recognition events. As noted above, these can include smart wearable (400) or interactive Sports Detection Device (500), such as a smart hockey puck, Sports Detection Devices. The function of the start command is to indicate to the Sports Detection Devices that a new sports session (e.g. practice, game, training session) has begun. This allows the Sports Detection Device to achieve lower power levels and save memory storage by not actively recording or analyzing until a sports session has commenced indicated by the received Session Start Command. Each Sports Session has an associated Sports Session ID that is a unique identifier of the given sports session. This unique identifier can be based on a global time stamp. The function of the global time stamp is to give the Sports Detection Device an updated time reference at the start of the session. In many cases, the Sports Detection Device may not have a global time reference, and thus can only track local time since its last power-up. In order to provide a global time reference to the Sports Detection Device which can be used for time-stamping the AI recognition events, the mobile computing device plays a key role of sharing a global time reference. With this global time reference, the Sports Detection Device can then assign timestamps to its generated AI recognition events that will later align with the timestamps of one or more video source(s), as described above.

Figure 9B:
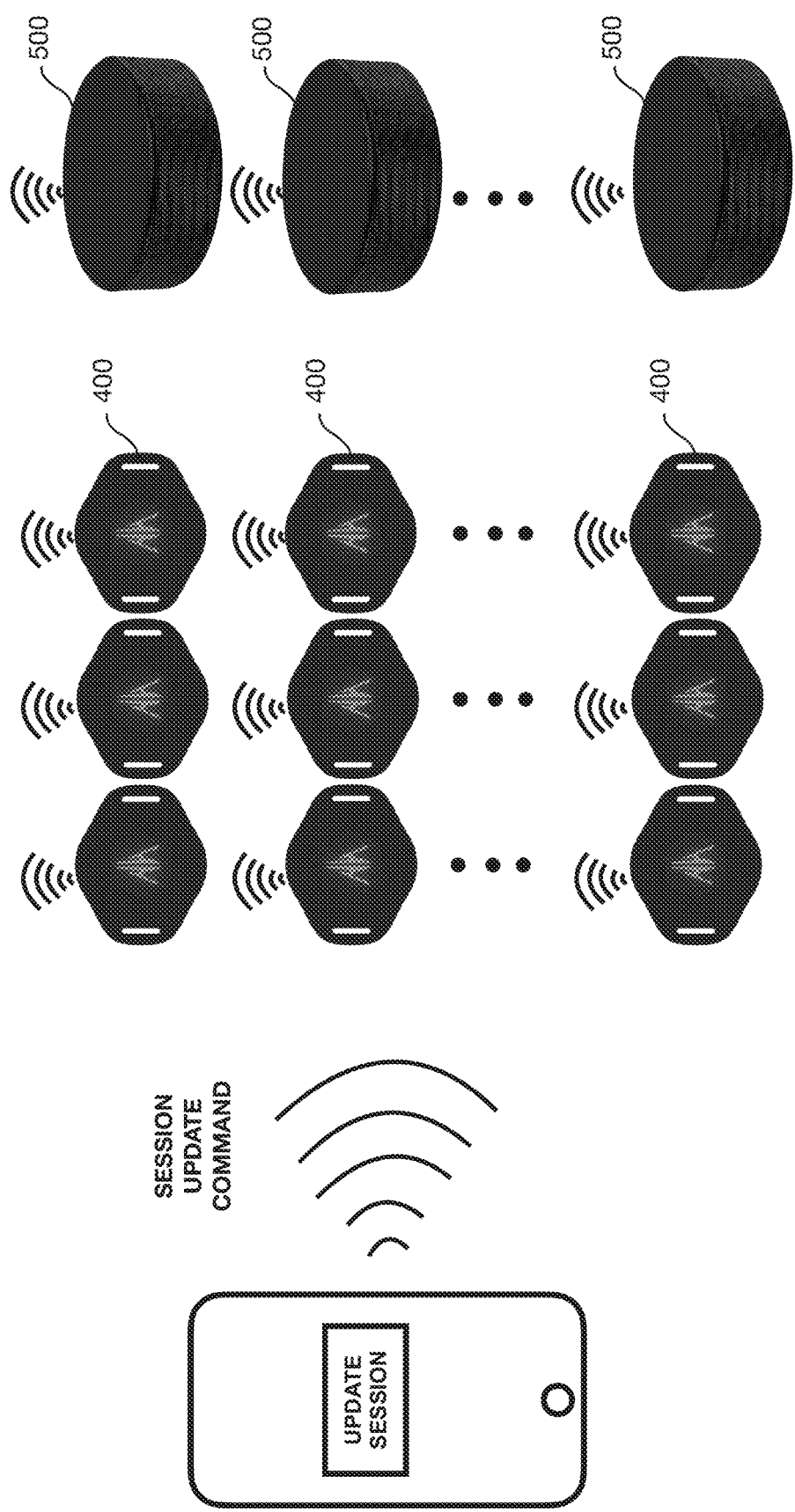

There are many instances where not all Sports Detection Devices receive the session start command. This could be the result of not being turned on, a delayed entering of the facility, an issue with receiving the session start command broadcast due to interference or signal strength and so forth. Thus, to ameliorate this concern, and as shown in FIG. 9B a session update command can be broadcast periodically. This session update command can include the original global time stamp from the session start command as well as a time offset. The offset can be in the form of second increments or other increments. For example, if a player associated with a wearable Sports Detection Device joins a practice 5 minutes late, then when the associated Sports Detection Device receives the session update command it could include the original global time stamp, plus a 300 second local time offset. The original global time stamp will help the Sports Detection Device to generate the appropriate Sports Session ID, while the offset will help the sensed data retrieved to be aligned according to the global time stamp. This then ensures that each of the Sports Detection Devices throughout the sports session maintain appropriate timing. In some cases, the session update command comes from Sports Detection Devices that were already included in the session and they serve to assist a late-arriving device to also join the session with appropriate time reference.

Figure 9C:
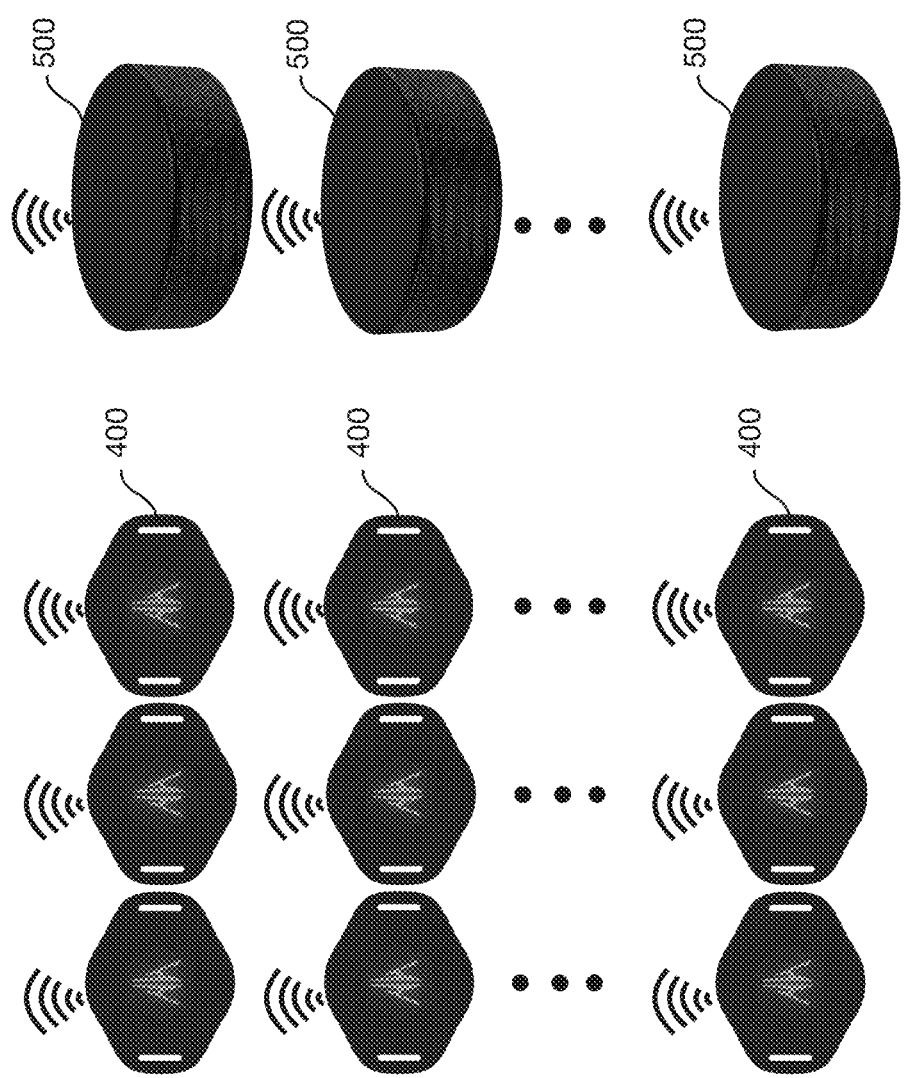
Figure 9C:
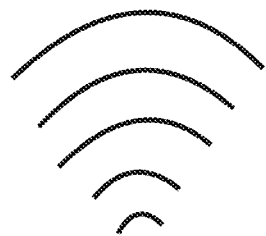
Figure 9C:
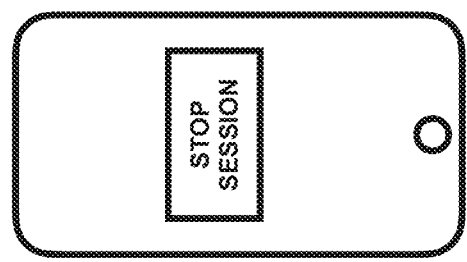

FIG. 9C illustrates a session stop command being broadcast to each of the Sports Detection Devices. The session stop command indicates to each of the Sports Detection Devices that the given sports session has ended. The Sports Detection Devices can then go into a lower power mode or memory conservation mode. The stop session command can also include the original global time stamp and a local time offset information, but that is optional. In some first cases Sports Detections Devices automatically stop sessions after a timeout period when the device no longer sees AI recognition events from sports actions. In some second cases, Sports Detection Devices automatically start sessions when AI recognition events from sports actions are observed and only save those events to memory upon receipt of a stop session command. Lastly in some third cases, Sports Detection Devices automatically start and stop sessions based on AI recognition events from sports actions. All three cases provide different levels of simplifying the number of steps that are required of a user of the computing device.

Figure 9D:
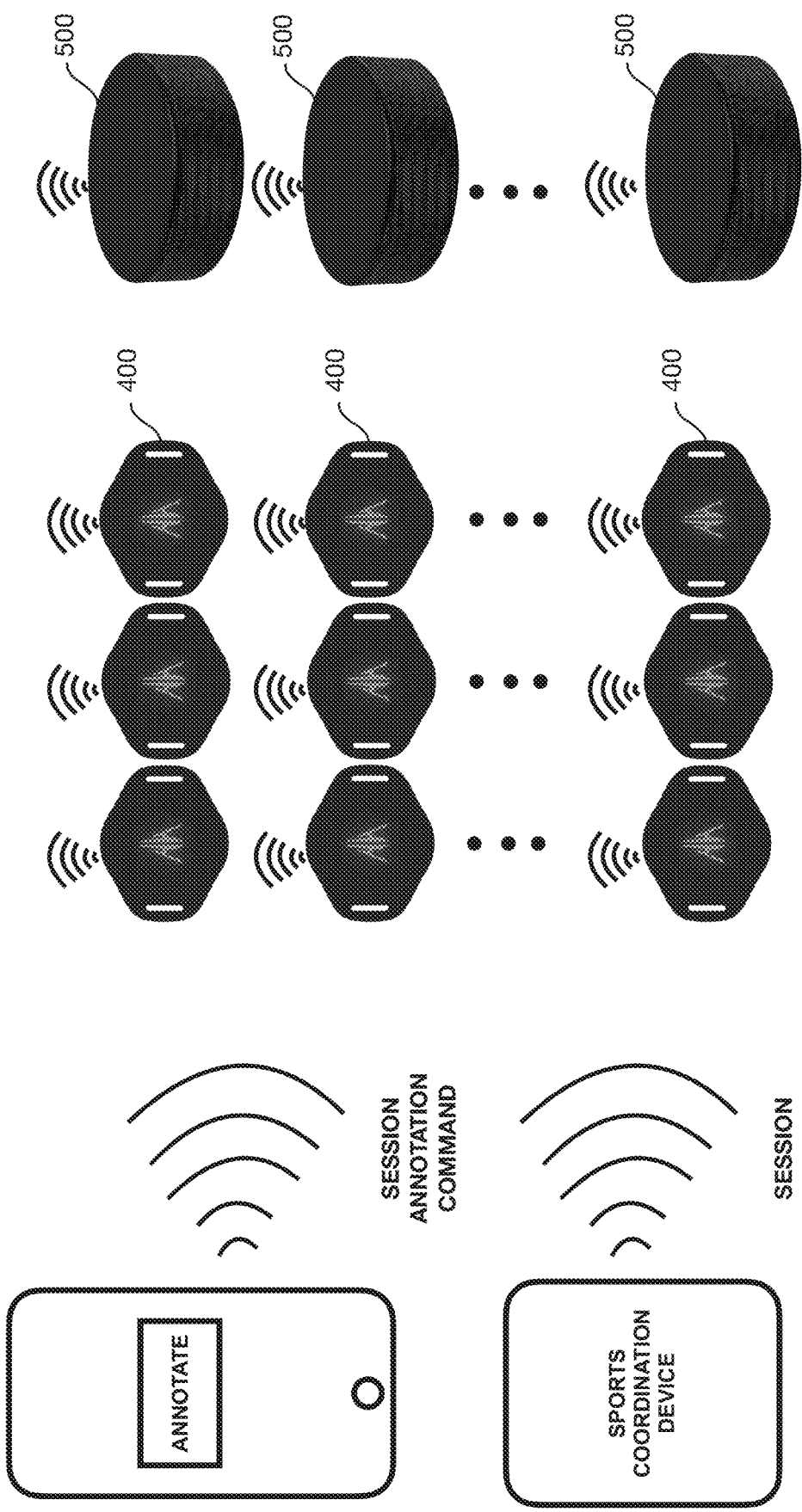

FIG. 9D illustrates a session annotation command being broadcast to each of the Sports Detection Devices either from a mobile computing device like the other commands or through a sports coordination device. As noted above, the sports coordination device can include any number of devices used in the operation of sports session, which include scorekeeping devices, timekeeping devices, other statistical capturing devices, and video capture devices. One of the primary purposes of the annotation command is to associate a specific annotation to a moment in time during the sports session. For example, if a player scores, the annotation can include that a score was made at a particular time. This can then be used as another filtering mechanism when generating intelligent video segments, such as splicing together all video sources from 3 seconds before until 2 seconds after the score. These annotations could include coaching annotations, which could be any number of comments that the coach wants to readily ascertain or later review, for example a positive pass or a poor pass. An example, of video capture devices could include when a particular video capture device is live-streaming versus simply recording. Another example, includes an annotation of the video capture device location. Again, each of these types of annotations can be used as part of an input query to help rapidly sort and intelligently compile a video based on the input query parameters.

Figure 9E:
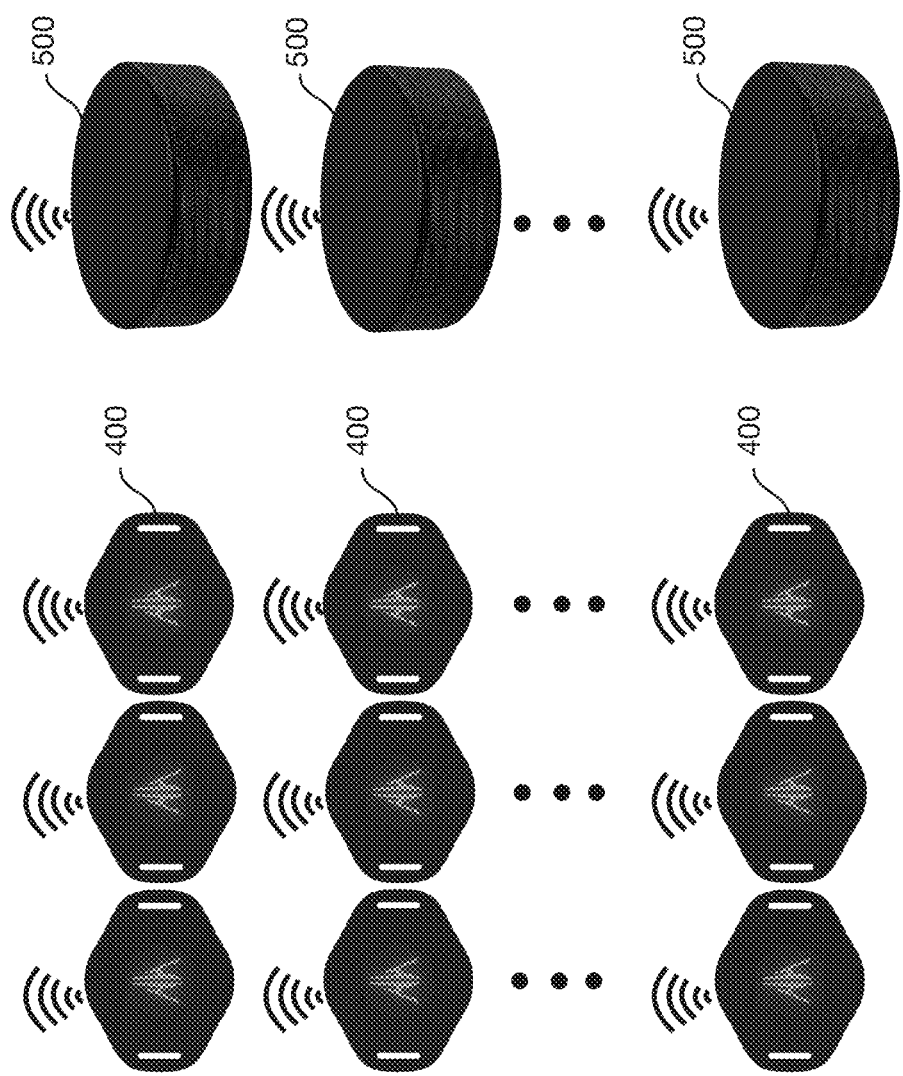

FIG. 9E illustrates yet another type of command being broadcast, which is a time trial command. This time-trial command can put the Sports Detection Device on notice to capture the beginning and ending of a series of sports actions and associate the time therewith. For example, partway through a hockey practice, a coach wants to have each of the players engage in a timed-trial of seeing how fast they can skate to one end of the rink and back. With the timed-trial command, all players can be timed in parallel but the players do not have to all simultaneously start at the same time. They can start when they are ready, because the AI recognition on each of the Sports Detection Devices will identify when the given player starts their sprint and when they ended it based on the sensed data received into the Sports Detection Device. Those results can then be immediately sent to a device such as the same mobile computing device the coach used to initiate the timed trial command for display or retrieved at a later point. Time trial commands can include the option of immediately broadcasting the results from the Sports Detection Device without having to send the additional sports action data retrieved during the sports session.

FIGS. 10A-E illustrate broadcast commands similar to those of FIGS. 9A-E including additional Team ID information. In some embodiments, the Sports Detection Devices are configured to broadcast a return signal indicating that they received the command broadcast. In the instance where the broadcast command includes a command code, sports session ID, time offset and team ID, the Sports Detection Device can determine whether the broadcast command applies to the given Sports Detection Device and if so, respond accordingly.

Figure 11:
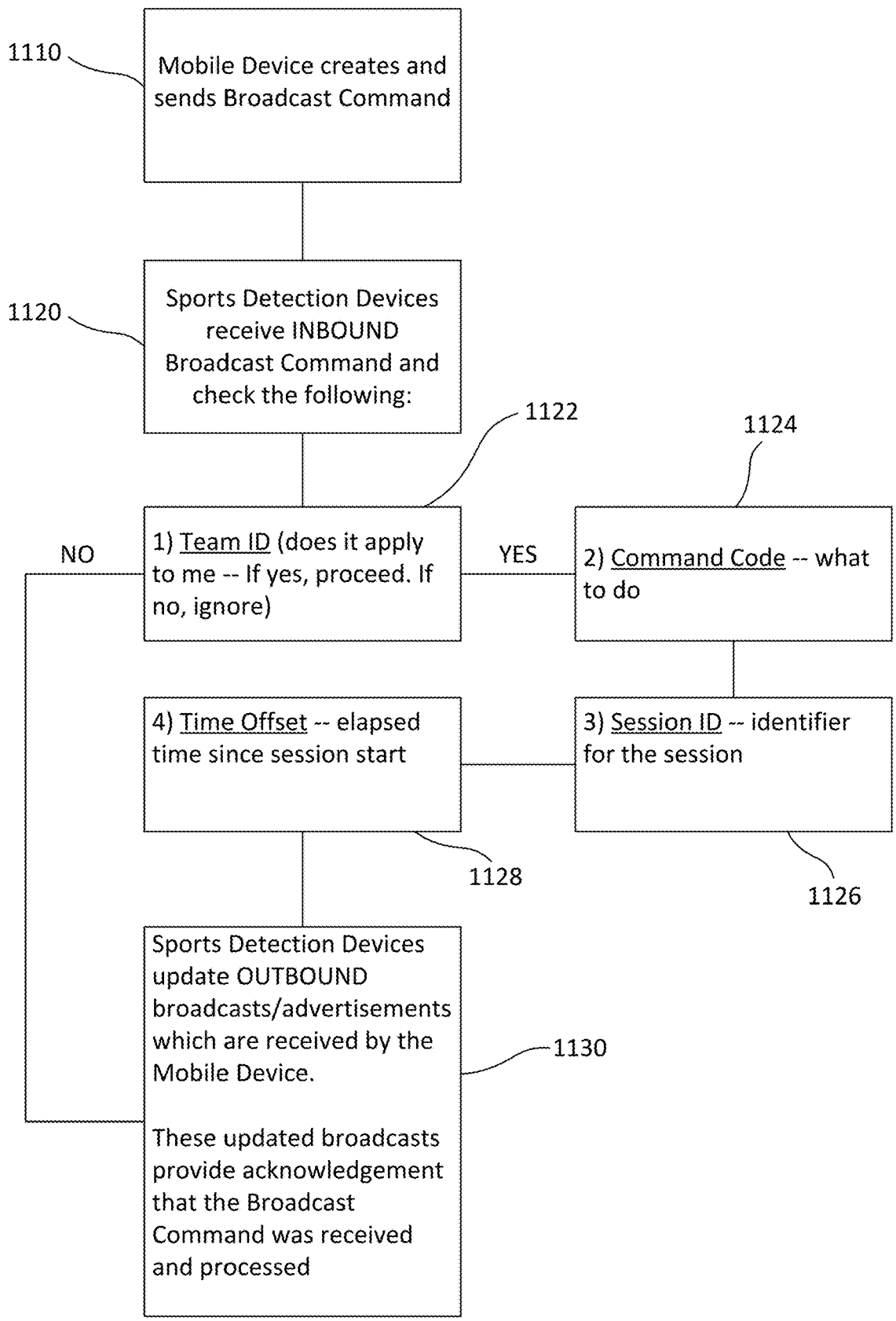
FIG. 11 illustrates a flowchart illustrating an example workflow of broadcasting commands to a plurality of Sports Detection Devices and receiving acknowledgement back.

FIG. 11 illustrates a flowchart illustrating an example workflow of broadcasting commands to a plurality of Sports Detection Devices. A user, such as a coach, can generate a command code to be broadcast to a plurality of devices during step 1110. This can be generated on a user interface running on an application on mobile computing device such as a smartphone. Once the broadcast command is generated then it can be broadcast out to all the Sports Detection Devices in the area. In the instance, multiple teams or groups are practicing or playing in the same vicinity, the broadcast command can include a Team ID or identification number associated with it. Once a given Sports Detection Device receives the inbound command during step 1120 it can then determine what to do with it. Initially it can determine if the Sports Detection Device is associated with the broadcast Team ID 1122. If so, then it can proceed to process the additional information including the received command code 1124, store or reconfirm the session ID 1126, and maintain or confirm the appropriate time offset 1128, which as noted above can be an offset from a global time stamp that is associated with the session ID. After that is the processed by the Sports Detection Device, an outbound broadcast 1130 from each Sports Detection Device can be sent with information indicating it received the given command or in some instances ignored it. Similarly, the mobile computing device receiving the outbound signal 1130 can confirm what it does with the information. Namely, does it have the same Team ID that was broadcast and if not choose to ignore the broadcast. The team ID can integral to communicating via an open broadcasting manner with regards to when the associated devices should take action or not in an area with multiple teams so as to not interfere with another sports session.

As noted, an important aspect of the approaches described above is that the control and communication of the Sports Detection Devices by the mobile computing devices can be accomplished without forming a connection to any one or more devices. This connectionless approach for command and control is important because often mobile computing devices have limitations on the maximum number of connections that can be formed (e.g., 15 devices maximum). When managing a team sport like hockey there could be 20 players using wearables and another 10-20 smart hockey pucks. By using a connectionless approach for command and control the system can support a large number of devices that is much greater than any limitation imposed by a specific mobile device.

Figure 12:
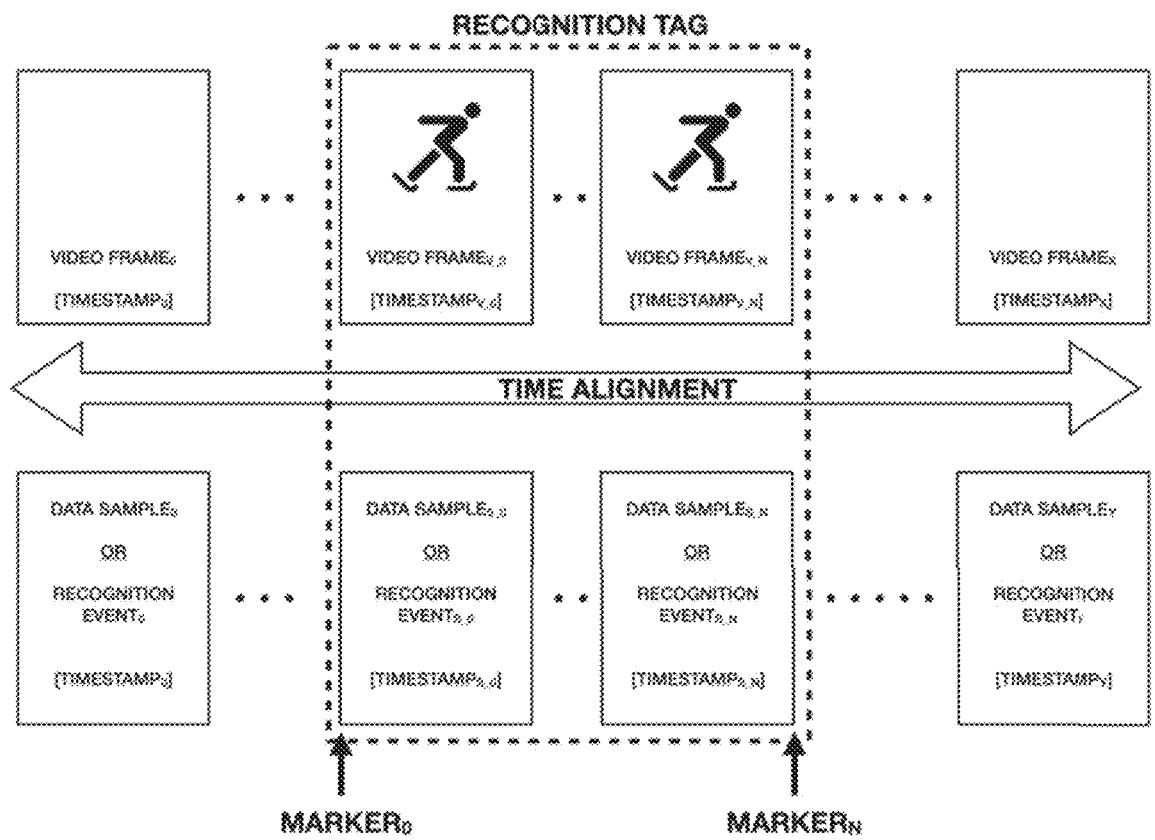
FIG. 12 illustrates an interface showing where the video data and the sensed data are time-aligned, this interface can include the video frame, data sample, recognition event and time stamp.

As noted above, video data or other source data can be time-aligned with the sensed sports action data received from the Sports Detection Devices noted. FIG. 12 illustrates an interface showing where the video data and the sensed data are time-aligned. The sensed data can include a beginning and ending marker of a given sports action. These markers can be expanded in a manual mode if the user prefers an expanded clip, shortened clip or offset clip of the action. Additional indicators can be present such as the type of sports action performed, the player profile associated with the sports action, speed, direction, rotation and other measured statistics can also be shown. For example, the velocity of a given slapshot and the time of the hockey puck spent on the hockey stick during the slapshot, the given player's average velocity and other advanced statistics and measurements.

It should be well understood that in addition to video sources, audio sources could likewise be substituted in place, as well any other type of globally time stamped captured information. Once time-aligned a myriad of intelligent splicing and outputting of information can be generated as noted by several examples above. One interesting case includes time-aligning sensed data from two different player profiles. For example, if one hockey player checks another hockey player, what is the impact force on each. This information can be time-aligned without video or audio data, but other sensed data.

Figure 13:
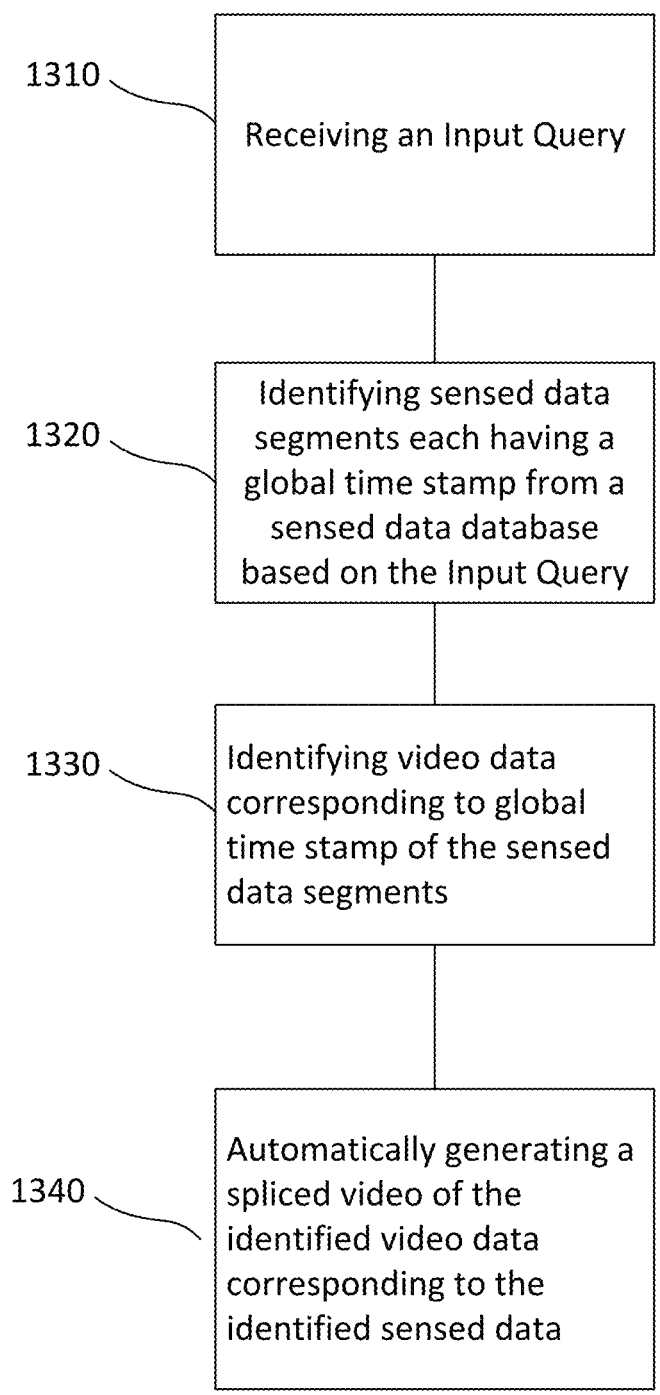
FIG. 13 illustrates a flowchart illustrating automatically generating a spliced video based on an input query.

FIG. 13 illustrates a method of automatically generating intelligent videos of sports actions. In step 1310 a user enters an input query. This query can include various sorting or analysis parameters such as: type of sports action, player profile, length of sports action, number of sports action performed in a session, footage before or after a specific sports action, comparison of sports actions between two or more players during one or more sports sessions, sports actions with a particular attribute (such as 10 fastest slapshots or 10 slowest slapshots), sequential sports actions, specific or group of sports session, location of sports session, sports sessions involving particular players, annotation information, timed-trial information and so forth. Once the query is input the computer can process the request to search and identify 1320 in a database containing sensed sports action data provided by a plurality of Sports Detection Devices over a plurality of sports sessions. Once the identified results from the sensed sports database are obtained, the next step 1330 can include searching the video database for video data that has the same global time stamped information as the identified sensed sports data. These sensed data and video data can then be intelligently time-aligned and spliced together in step 1340. It should be noted that the input query can also include parameters about how and what type of video data is used. For example, if multiple video sources are identified for a given sensed sports action, then input query can guide which set is used, if both or used, if they used sequentially or combined simultaneously in a side-by-side or grid view. Other editing outputs should be readily understood by those in the art, once the sensed data and video have become aligned.

Figure 14:
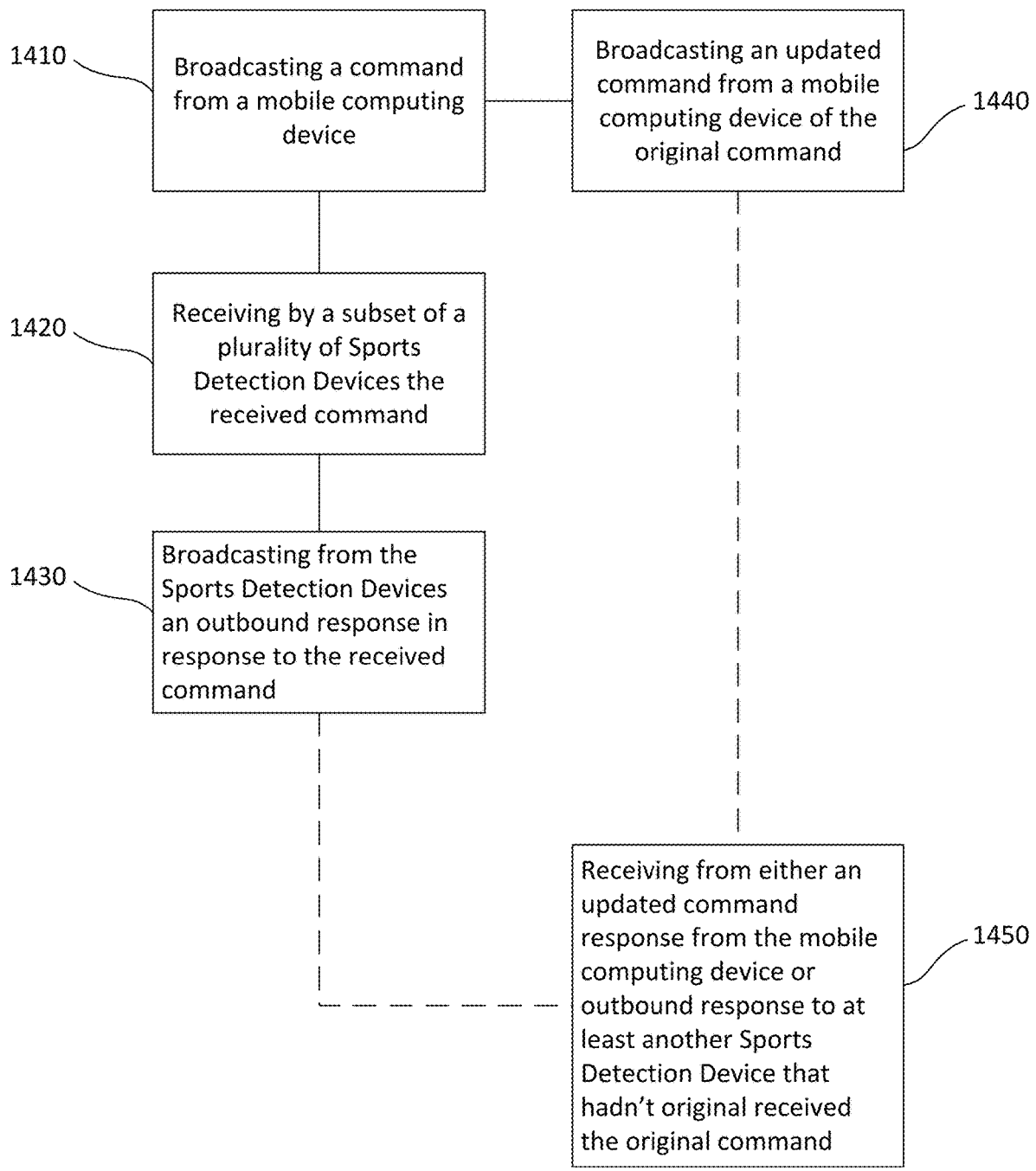
FIG. 14 illustrates a workflow where Sports Detection Devices can receive commands directly or indirectly.

FIG. 14 illustrates a workflow where Sports Detection Devices can receive commands directly or indirectly. In this workflow, a mobile computing device broadcasts an original command in step 1410. This has been described in various ways above. That broadcast may only be received by a subset of the intended plurality of Sports Detection Devices in step 1420. Once the command is received, that subset of Sports Detection Devices can then broadcast in response to the original command the appropriate outbound response in step 1430. In the interim the computing mobile device can rebroadcast the original command in an updated command that is broadcast in step 1440. Now the remaining Sports Detection Devices that haven't already received the original command can either be notified from the updated broadcast command or alternatively, receive the outbound response, which is indicative of what the original command requested as well as the latest time offset and thus begin to respond appropriately. This multi-approach communication method can help when the mobile computing device goes into a low power mode and no longer rebroadcasts every second, or when certain Sports Detection Devices are in areas that are out of reach due to distance, interference or simply arriving late or being powered on late. Thus, ensuring that each of the Sports Detection Devices is running as expected during a sports session, because of the direct or indirect method of broadcasts from the mobile computing device or other Sports Detection Devices.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A method of coordinating time on a plurality of sports detection devices comprising the steps of:
    broadcasting a session identification number to a plurality of sports detection devices, wherein each sports detection device is comprised of:
a sensor array system having a plurality of sensors and an AI recognition engine;
    at least one CPU or MCU;
    memory,
    antenna; and
    a power source, wherein the AI recognition engine is configured to receive sensed data from the plurality of sensors from an associated individual performing sports actions and identify from the sensed data using an action detection model a specific sports action;

wherein the session identification number is associated with a global time stamp, a unique sports session, and at least one command code;

generating a plurality of local time stamps in response to the generated received session identification number;

receiving sensed data by at least one of the plurality of sports detection devices and determining using at least one of the sports detection devices whether a sports action has occurred during the unique sports session; and associating a local time stamp with each determined sports action.

2. The method of coordinating time on a plurality of sports detection devices of claim 1, further comprising the step of:

receiving video data associated with the sports session, wherein the video data includes a global time stamp.

3. The method of coordinating time on a plurality of sports detection devices of claim 2, further comprising the step of:

time aligning the video data with each determined sports action.

4. The method of coordinating time on a plurality of sports detection devices of claim 3, further comprising the step of:

automatically editing the time aligned video to portions wherein a determined sports action occurred.

5. The method of coordinating time on a plurality of sports detection devices of claim 4, further comprising the step of:

automatically editing the time aligned video further to portions wherein a particular individual associated with the determined sports action occurred.

6. The method of time-aligning data on a plurality of sports detection devices of claim 1, further comprising the step of:

sending a connectionless signal indicating a timed-trial mode is initiated.

7. The method of coordinating time data on a plurality of sports detection devices of claim 1, further comprising the step of:

monitoring by the sports detection device for the beginning of a sports action to be timed;

identifying by the sports detection device the ending of the sports action to be timed; and sending the timed sports action from the sports detection device to a computing device.

8. The method of coordinating time data on a plurality of sports detection devices of claim 1, further comprising the step of generating one of the following commands: start, stop, update, timed-trial and annotation.

9. The method of coordinating time data on a plurality of sports detection devices of claim 8, wherein the annotation command further includes inputting into a wireless device one of an audio input, visual input, and pre-determined marker to be associated with the local time stamp and configured to be retrievable later with the associated sensed data at or around the moment of the annotation command.

10. The method of coordinating time data on a plurality of sports detection devices of claim 1, further comprising the step of receiving multiple sets of video data each having a global time stamp from a plurality of video sources associated with the sports detection session, and wherein each set of video data is automatically time-aligned to the sensed data from the sports detection device.

11. The method of coordinating time data on a plurality of sports detection devices of claim 1, further comprising the step of periodically broadcasting a signal during the sports session that includes the original global time stamp sent and a local time offset.

12. The method of coordinating time data on a plurality of sports detection devices of claim 11, wherein any sports detection device receiving the periodically broadcast signal after the original broadcasting of the global time stamp can then be associated with the same sports session.

13. The method of coordinating time data on a plurality of sports detection devices of claim 11, wherein the global time stamp is in UTC form and the local time offset is in 1 second increments from the original global time stamp.

14. The method of coordinating time data on a plurality of sports detection devices of claim 2, further comprising the steps of:

receiving an input query, identifying sensed data based on the query, automatically time-aligning the identified sensed data to the video data, and generating an output of the time-aligned identified sensed data and video data in response to input query.

15. The method of coordinating time data on a plurality of sports detection devices of claim 14, wherein the input query includes any of: type of sports action, player, play sequence, sports session, and type of video data.

16. The method of coordinating time data on a plurality of sports detection devices of claim 15, further including associating with a player a player profile, and wherein the player profile is associated with one or more sports detection devices.

17. The method of coordinating time data on a plurality of sports detection devices of claim 1, further comprising the step of receiving from an annotation device an annotation command.

18. A method of communicating with a plurality of sports detection devices comprising the steps of:

broadcasting from a mobile computing device a command that includes a session identification number that includes a global time stamp as part of the command to a plurality sports detection devices;

associating the session identification number with a unique sports session;

generating a plurality of local time stamps in response to the received session identification number;

sending an outbound broadcast from each of the plurality of sports detection devices indicative that each received the broadcast command from the mobile computing device;

rebroadcasting the command periodically from the mobile computing device or from one of the plurality of sports detection devices; and receiving by at least one additional sports detection device the rebroadcast command or the outbound response, and generating a local time stamp based on the session identification associated with the sports session on the additional sports detection device.

\* \* \* \* \*